(12) United States Patent
Kubach et al.

(10) Patent No.: US 7,774,242 B2
(45) Date of Patent: Aug. 10, 2010

(54) PROXIMITY SENSING

(75) Inventors: Uwe Kubach, Waldbronn (DE); Christian Decker, Karlsruhe (DE)

(73) Assignee: SAP AG, Walldorf (DE)

( * ) Notice: Subject to any disclaimer, the term of this patent is extended or adjusted under 35 U.S.C. 154(b) by 1692 days.

(21) Appl. No.: 10/877,748

(22) Filed: Jun. 25, 2004

(65) Prior Publication Data
US 2005/0285740 A1 Dec. 29, 2005

Related U.S. Application Data

(60) Provisional application No. 60/554,103, filed on Mar. 17, 2004.

(51) Int. Cl.
*G06Q 10/00* (2006.01)
*G08B 13/14* (2006.01)
(52) U.S. Cl. .................. 705/28; 340/571; 340/572.1
(58) Field of Classification Search ............... None
See application file for complete search history.

(56) References Cited

U.S. PATENT DOCUMENTS

| | | | |
|---|---|---|---|
| 5,521,652 A * | 5/1996 | Shalvi | 348/819 |
| 6,507,279 B2 | 1/2003 | Loof | |
| 6,587,835 B1 | 7/2003 | Treyz et al. | |
| 6,640,214 B1 | 10/2003 | Nambudiri et al. | |
| 6,659,344 B2 | 12/2003 | Otto | |
| 6,676,014 B2 | 1/2004 | Catan | |
| 6,684,623 B2 * | 2/2004 | Langston et al. | 60/226.2 |
| 7,061,381 B2 * | 6/2006 | Forcier et al. | 340/572.2 |
| 7,088,242 B2 * | 8/2006 | Aupperle et al. | 340/539.32 |
| 2003/0214387 A1 | 11/2003 | Giaccherini | |

OTHER PUBLICATIONS

Intermec "Real-World RFID Solutions"—2 pages.
Intermec—"7 Places Retailers Can Benefit from RFID"—4 pages.

* cited by examiner

*Primary Examiner*—F. Ryan Zeender
*Assistant Examiner*—Faris Almatrahi
(74) *Attorney, Agent, or Firm*—Brake Hughes Bellermann LLP

(57) ABSTRACT

A method and apparatus for proximity sensing is described and illustrated. In one embodiment, the invention is an apparatus. The apparatus includes a processor. The apparatus also includes a memory coupled to the processor. The apparatus further includes a radio frequency interface coupled to the processor. The apparatus also includes an antenna coupled to the radio frequency interface. The memory embodies an identifier of an associated item along with specific information related to the associated item. The memory also embodies instructions which, when executed by the processor, cause the processor to exchange the identifier with similar apparatuses through the radio frequency interface and antenna and cause the processor to compare the specific information with information received from the similar apparatuses.

28 Claims, 18 Drawing Sheets

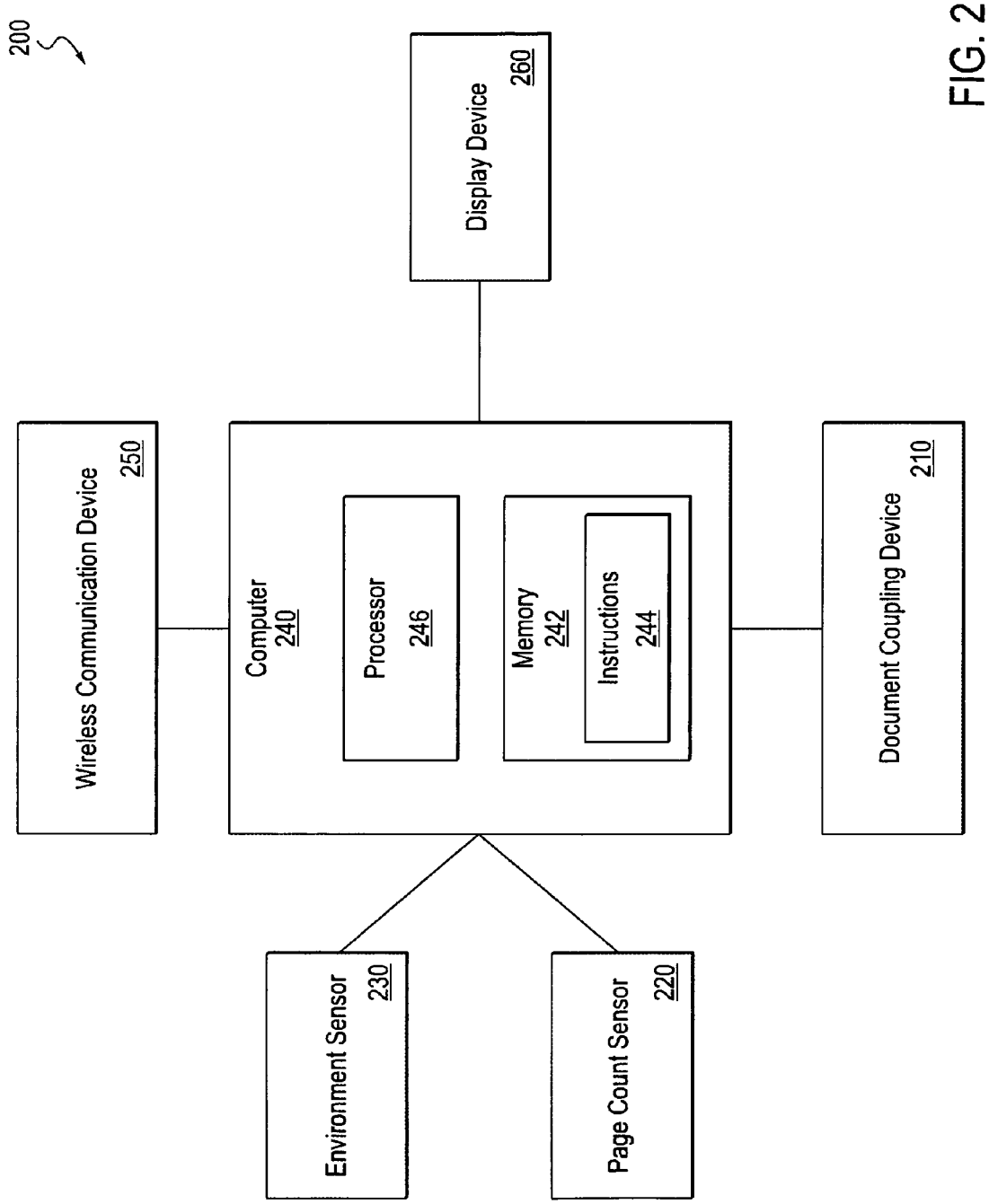

PROXIMITY SENSING

This application claims the benefit of U.S. Provisional Application No. 60/554,103 filed on Mar. 17, 2004.

FIELD

This description relates generally to tracking items and people, and more specifically to tracking materials, documents, and/or people in relation to unauthorized locations and hazardous conditions or other undesirable or desirable combinations.

BACKGROUND

Materials, documents and people may move into both desirable and undesirable locations. For example, a hazardous material may be put near another hazardous material, increasing the potential hazard. Similarly, a person may move into a hazardous or restricted area, either without authorization or simply by mistake. Similarly, documents may be taken to places they should not go, or shown to people who should not see them.

Alternatively, all of these examples may be prevented through use of tracking technology. Providing a method to intelligently warn against co-location of hazardous materials may be useful. Similarly, providing a method of independently determining whether a person is authorized to enter an area may be useful. Moreover, providing a method of tracking movement of a document may be useful. Tracking of the document may be related to making sure the document only goes where it should, and may also be related to verifying the authenticity of signatures on a document, for example.

SUMMARY

The present invention is described and illustrated in conjunction with systems, apparatuses and methods of varying scope. In addition to the aspects of the present invention described in this summary, further aspects of the invention will become apparent by reference to the drawings and by reading the detailed description that follows. A method and apparatus for proximity sensing is described and illustrated.

In one embodiment, the invention is an apparatus. The apparatus includes a processor. The apparatus also includes a memory coupled to the processor. The apparatus further includes a radio frequency interface coupled to the processor. The apparatus also includes an antenna coupled to the radio frequency interface. The memory embodies an identifier of an associated item along with specific information related to the associated item. The memory also embodies instructions which, when executed by the processor, cause the processor to exchange the identifier with similar apparatuses through the radio frequency interface and antenna and cause the processor to compare the specific information with information received from the similar apparatuses.

In another embodiment, the invention is a proximity sensor. The proximity sensor is a Smart-It having a memory, wherein the memory has stored therein an identifier for a material of a cargo accompanying the proximity sensor.

In yet another embodiment, the invention is a proximity sensor. The proximity sensor is a Smart-It to receive a set of one or more identifiers for a material of a cargo to accompany the proximity sensor.

In yet another embodiment, the invention is a proximity sensor. The proximity sensor is a Mote to receive a set of one or more identifiers for a material of a cargo to accompany the proximity sensor.

In an alternate embodiment, the invention is a method. The method includes detecting in a first proximity sensor a nearby second proximity sensor. The method also includes receiving information from the second proximity sensor. The method further includes comparing the information from the second proximity sensor to stored information of the first proximity sensor. The method also includes acting on results of the comparison.

In another alternate embodiment, the invention is a machine readable medium embodying instructions which, when executed by a processor, cause the processor to perform a method. The method includes detecting a nearby proximity sensor. The method also includes receiving information from the proximity sensor. The method further includes comparing the information from the proximity sensor to stored information. Moreover, the method includes acting on results of the comparison.

In still another embodiment, the invention is an apparatus. The apparatus includes a first proximity sensor coupled to a stationary object. The first proximity sensor includes a processor and a memory coupled to the processor. The first proximity sensor also includes a radio frequency interface coupled to the processor. The first proximity sensor further includes an antenna coupled to the radio frequency interface. Within the first proximity sensor, the memory embodies a set of identifiers along with specific information related to the set of identifiers. The memory also embodies instructions which, when executed by the processor, cause the processor to receive a comparison identifier from any nearby proximity sensor through the radio frequency interface and antenna. The instructions also cause the processor to compare the comparison identifier with identifiers of the set of identifiers.

In yet another alternate embodiment, the invention is a material tracking means. The material tracking means includes means for sensing a nearby material tracking means. The material tracking means also includes means for exchanging data with the nearby material tracking means. Furthermore, the material tracking means includes means for comparing data from the nearby material tracking means to data of the material tracking means. Moreover, the material tracking means includes means for alerting a user responsive to results of the means for comparing.

The present invention is exemplified in the various embodiments described, and is limited in spirit and scope only by the appended claims.

BRIEF DESCRIPTION OF THE DRAWINGS

The present invention is illustrated in various exemplary embodiments and is limited in spirit and scope only by the appended claims.

FIG. 2 is a block diagram illustrating an embodiment of a physical document monitoring device for the system in FIG. 1.

Like reference symbols in the various drawings indicate like elements.

DETAILED DESCRIPTION

Figure 1:
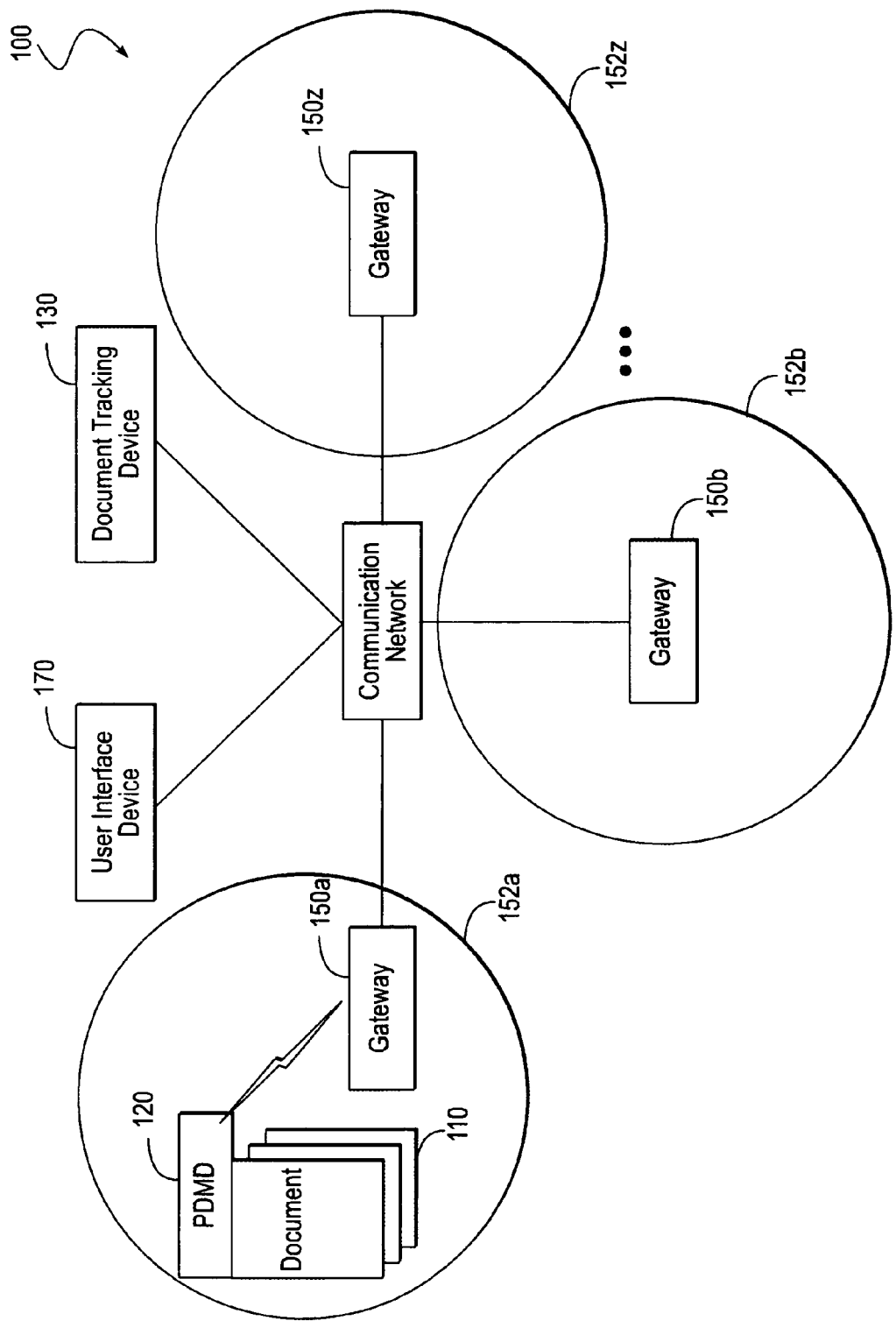
FIG. 1 is a block diagram illustrating an embodiment of a system for document management.

The present invention is described and illustrated in conjunction with systems, apparatuses and methods of varying scope. In addition to the aspects of the present invention described in this summary, further aspects of the invention will become apparent by reference to the drawings and by reading the detailed description that follows. A method and apparatus for proximity sensing is described and illustrated.

In one embodiment, the invention is an apparatus. The apparatus includes a processor. The apparatus also includes a memory coupled to the processor. The apparatus further includes a radio frequency interface coupled to the processor. The apparatus also includes an antenna coupled to the radio frequency interface. The memory embodies an identifier of an associated item along with specific information related to the associated item. The memory also embodies instructions which, when executed by the processor, cause the processor to exchange the identifier with similar apparatuses through the radio frequency interface and antenna and cause the processor to compare the specific information with information received from the similar apparatuses.

In another embodiment, the invention is a proximity sensor. The proximity sensor is a Smart-It having a memory, wherein the memory has stored therein an identifier for a material of a cargo accompanying the proximity sensor.

In yet another embodiment, the invention is a proximity sensor. The proximity sensor is a Smart-It to receive a set of one or more identifiers for a material of a cargo to accompany the proximity sensor.

In yet another embodiment, the invention is a proximity sensor. The proximity sensor is a Mote to receive a set of one or more identifiers for a material of a cargo to accompany the proximity sensor.

In an alternate embodiment, the invention is a method. The method includes detecting in a first proximity sensor a nearby second proximity sensor. The method also includes receiving information from the second proximity sensor. The method further includes comparing the information from the second proximity sensor to stored information of the first proximity sensor. The method also includes acting on results of the comparison.

In another alternate embodiment, the invention is a machine readable medium embodying instructions which, when executed by a processor, cause the processor to perform a method. The method includes detecting a nearby proximity sensor. The method also includes receiving information from the proximity sensor. The method further includes comparing the information from the proximity sensor to stored information. Moreover, the method includes acting on results of the comparison.

In still another embodiment, the invention is an apparatus. The apparatus includes a first proximity sensor coupled to a stationary object. The first proximity sensor includes a processor and a memory coupled to the processor. The first proximity sensor also includes a radio frequency interface coupled to the processor. The first proximity sensor further includes an antenna coupled to the radio frequency interface. Within the first proximity sensor, the memory embodies a set of identifiers along with specific information related to the set of identifiers. The memory also embodies instructions which, when executed by the processor, cause the processor to receive a comparison identifier from any nearby proximity sensor through the radio frequency interface and antenna. The instructions also cause the processor to compare the comparison identifier with identifiers of the set of identifiers.

In yet another alternate embodiment, the invention is a material tracking means. The material tracking means includes means for sensing a nearby material tracking means. The material tracking means also includes means for exchanging data with the nearby material tracking means. Furthermore, the material tracking means includes means for comparing data from the nearby material tracking means to data of the material tracking means. Moreover, the material tracking means includes means for alerting a user responsive to results of the means for comparing.

In one embodiment, proximity sensing may be utilized in conjunction with document management. Accordingly, document management is set forth in detail along with some aspects of proximity sensing as it may relate, prior to setting forth details of proximity sensing. Document management includes monitoring a physical version of a document. The monitoring may include determining a state of the physical version, such as, for example, number of pages, location, and/or environmental condition. The state may be stored and/or analyzed to ensure that the physical version of the document is valid. Document management, however, may also include a variety of other features.

Techniques are provided for document management. In one general aspect, document management is performed, at least in part, at a physical document and includes sensing a state of a document, generating a signal representing the document state, determining a document state based on the signal, and generating a wireless message representing the document state.

The document management may be facilitated by a device physically coupled to the document, an article including a machine-readable medium storing instructions operable to cause one or more machines to perform operations, or other appropriate apparatus. A device physically coupled to the document may include a document coupling device, a sensor coupled to the document coupling device, the sensor operable to sense a state of a document and to generate a signal representative thereof, and a computer coupled to sensor, the computer operable to determine a document state based on the signal. In some implementations, the document coupling device may bind the document and/or act as a sensor. The device may also include a wireless communication device operable to send data from and receive data for the computer.

The document state may include the number of document pages, the location of the document, and/or an environmental condition of the document. The number of document pages may be determined by sensing an electrical value affected by a dielectric.

Particular implementations may include receiving document meta-information and/or receiving state data for a non-physical version of a document. Certain implementations may include receiving an allowable document state, which may be expressed as a rule, storing an allowable document state, and/or determining whether an allowable document state has been violated. A visual indication of physical document status may be provided.

In another general aspect, document management is performed, at least in part, at a location remote from the document and includes storing non-physical versions of documents, receiving state data for physical versions of the documents, associating the state data with the appropriate non-physical versions, and managing access to the non-physical versions and the state data.

The document management may be facilitated by a physical device, an article including a machine-readable medium storing instructions operable to cause one or more machines to perform operations, or other appropriate apparatus. A physical device may include one or more memory locations operable to store non-physical versions of documents and state data for physical document versions and a document management engine operable to manage access to the non-physical document versions and the state data.

The state data may include the number of pages of a physical version, the location of a physical version, and/or an environmental condition of a physical version. State data may also be stored for non-physical versions of documents. Particular implementations may include determining whether a state change has occurred to a non-physical version of a document, determining whether the non-physical version has an associated physical document monitoring device, and, if the non-physical version has an associated physical document monitoring device, initiating a message representing the state change.

Certain implementations may include receiving a physical document registration request, determining if an associated non-physical document exists, and associating the non-physical version with a physical document monitoring device.

Some implementations may include storing allowable states for physical versions of documents, which may be expressed in rules. A message may be generated for a physical document monitoring device regarding an allowable state for a physical version of a document. Also, a message indicating that an allowable state has been violated may be received; if such a message has been received, the message may be associated with a non-physical version, and the notification of the violation stored. Whether an allowable state has been violated based on a received state may also be determined.

FIG. 1 illustrates a system 100 for document management. System 100 includes a document 110 that is to be managed. Coupled to document 110 is a physical document monitoring device 120. Physical document monitoring device 120 is operable to monitor at least one state of document 110 and to communicate the state to a document tracking device 130. Document tracking device 130 stores the state of the document. Physical document monitoring device 120 and/or document tracking device 130 may also analyze the document state, for example, to determine whether the document state is allowable.

In more detail, document 110 may be any tangible composition, collection, and/or arrangement of information. For example, document 110 may be a contract, a report, a manuscript, or any other composition of words on paper. Document 110 may, of course, also contain charts, pictures, graphs, tables, and/or other appropriate objects. Document 110 may be bound by a staple, a paper clip, a binder clip, or any other appropriate binding. In particular implementations, document 110 is bound by physical document monitoring device 120. In other implementations, however, document 110 need not be bound.

Physical document monitoring device 120 is coupled to document 110 and monitors the document. In general, physical document monitoring device 120 may monitor any of a variety of state information regarding document 110. For example, physical document monitoring device 120 may monitor the number of pages of document 110, the location of document 110, and/or an environmental condition of document 110. Physical document monitoring device 120 wirelessly communicates monitored states of document 110 to document tracking device 130.

In particular implementations, physical document monitoring device 120 also 30 determines whether a monitored state is allowable. The allowable states may be programmed locally at the physical document monitoring device or remotely. If a monitored state is not allowable, an appropriate indication may be displayed at the physical document monitoring device and/or communicated to document tracking device 130. The allowable states may be expressed as rules (e.g., $10°$ C.$\leq T \leq 40°$).

To allow physical document monitoring device 120 to communicate with document tracking device 130, system 100 includes a wireless link 140, gateways 150, and a communication network 160. Wireless link 140 may use any appropriate portion of the electromagnetic regime. For example, wireless link 150 may be a radio frequency (RF) link or an infrared (IR) link. If wireless link 150 is an RF link, it may be for a local area network (e.g., IEEE 802.11 or Bluetooth™) or for a wide area network (e.g., a cellular network using IS-95 or IS-136). If wireless link 150 is an IR link, it may operate according to the Infrared Data Association (IrDA) protocol. Physical document monitoring device 120 may send and/or receive data through wireless link 140.

System 100 uses gateways 150 to wirelessly receive data from and/or to wirelessly send data to physical document monitoring device 120. In general, gateways 150 may be any appropriate devices for wirelessly receiving and sending data. Gateways 150 may, for example, be wireless access points, base stations, or transceivers. In particular implementations, the gateways may be based on the Smart-Its Particle system from TecO of Karlsruhe, Germany.

As illustrated, system 100 includes a number of gateways 150, each gateway having a service area 152. Thus, when document 100 is within one of service areas 152, which may be adjustable for each gateway 150, physical document monitoring device 120 may communicate with document tracking device 130. Depending on the network configuration, physical document monitoring device 120 may communicate with document tracking device 130 as document 110 moves between service areas 152. In general, system 100 may have any number of gateways 150. In particular implementations, service areas 152 may be on a per room basis, and the physical document location may be included in communications between the physical document monitoring device and the document tracking device. To assist in fine grain location tracking, a Receiver Signal Strength Indication (RSSI) may be used in certain implementations.

Communication network 160 also assists in sending data between physical document monitoring device 120 and document tracking device 130. In general, communication network 160 may be any combination of switches, routers, repeaters, transponders, hubs, and/or other appropriate devices for sending data from one device to another. The communication network may, for example, be a local area network (LAN), a wide area network (WAN), a Public Switched Telephone Network (PSTN), or the Internet. Furthermore, communication network 160 may use any appropriate protocol, such as, for example, X.25, frame relay, Ethernet, or TCP/IP.

As mentioned previously, document tracking device 130 receives and stores the state data regarding document 110. In general, document tracking device 130 may be any appropriate device for receiving and storing data. Document tracking device 130 may also determine whether the document states are allowable.

In particular implementations, document tracking device 130 is a server that also stores a non-physical version of document 110. Thus, document tracking device 130 and physical document monitoring device 120 may share state information of the physical version (i.e., document 110) and the non-physical version of a document. This information may be used to validate the physical version of the document.

System 100 also includes a user interface device 170. User interface device 170 may be any appropriate device for allowing a user to interact with data in system 100. In particular implementations, user interface device 170 may be a personal computer (PC), a workstation (WS), or a personal digital assistant (PDA). To allow a user to interact with system data, the user interface device may enter into a client-server relationship with document tracking device 130 and visually present a user interface, such as, for example, a graphical user interface (GUI), to the user. In particular implementations, user interface device may implement a web interface.

In one mode of operation, physical document monitoring device 120 is associated with a document 110 through user interface device 170. The association may include informing document tracking device 130 of the association so that it can prepare to track the document. The association may, for example, be made at a printer that printed the document. Additionally, the allowable states of document 110 are received by physical document monitoring device 120 through user interface device 170. In certain implementations, the allowable states may be received by document tracking device 130, to the exclusion of physical document monitoring device 120 or in conjunction with physical document monitoring device 120.

After initial set up, physical document monitoring device 120 begins monitoring the appropriate states of document 110. If a monitored state is sensed, physical document monitoring device 120 communicates the state to document tracking device 130 through wireless link 140, gateway 150, and communication network 160. Document tracking device 130 associates the state with document 110 and stores the state, for later retrieval and analysis. Physical document monitoring device 120 and/or document tracking device 130 may time stamp the sensed state to assist in analysis.

Physical document monitoring device 120 also determines whether a sensed state is allowable. If a sensed state is allowable, physical document monitoring device 120 may resume sensing states. If a sensed state is not allowable, physical document monitoring device 120 sends an indication of the violated state to document tracking device 130, which stores the indication.

Physical document monitoring device 120 may continue to monitor document 110 for any appropriate period of time. For example, physical document monitoring device 110 may monitor the document until an unallowable state is encountered or until a designated period of time has expired.

User interface device 170 may also be used to determine the current and past states of the physical version. The user interface may also be used for configuring system 100.

System 100 has a variety of features. For example, the state of a physical document may be monitored and recorded. This may assist in determining the state of the document (e.g., location) or the validity of the document at a later time. For instance, knowing the location history of a physical version may allow for determining whether access was improperly allowed. Monitoring and recording the physical document state may also assist in determining the validity of a non-physical version of the document. Thus, consistency between a physical version of a document and a non-physical version of a document may be enhanced. Furthermore, validity issues may be identified quickly. As another example, the state of a non-physical version of a document may be available at the physical document. Thus, a physical document custodian may be able to determine whether validity issues exist with the physical document. As an additional example, properties, like integrity and access restrictions, as well as the tracking of changes, may be synchronized between physical versions and non-physical versions of a document. This may allow physical versions and non-physical versions to be aware of and reactive to changes at each other. For instance, a change in a non-physical version (e.g., a change in information) may lead to a reaction at the physical version (e.g., a change in status display). In the reverse, a change of the physical version's state (e.g., a change in location) may be reflected by a change of the information associated with the non-physical version. As another example, the implementation of the document management may occur in such a way that the reasons for physical documents are not diminished. Also, because various implementations are available with standard paper, document management may be achieved without requiring special paper.

Although FIG. 1 illustrates a system for document management, other implementations may include fewer, additional, and/or a different arrangement of components. For example, a document management system may have a number of documents that are being monitored, and each document may have its own physical document monitoring device. As another example, the service areas of the gateways may be contiguous or overlap. Thus, a document may move within a document management system with a physical document monitoring device rarely, if ever, being out of communication with a document tracking device. As a further example, the communication network may be part of a larger communication network (e.g., the Internet).

FIG. 2 illustrates a physical document monitoring device 200. Physical document monitoring device 200 is one example of physical document monitoring device 120 in FIG. 1. As illustrated, physical document monitoring device 200 includes a document coupling device 210, a page count sensor 220, an environment sensor 230, a computer 240, a wireless communication device 250, and a display 260.

Document coupling device 210 is operable to physically couple physical document monitoring device 200 to a physical version of a document. Document coupling device 210 may, for example, be a staple, a paper clip, or a binder clip.

Implementing the document coupling device as a document binding apparatus has the advantage of incorporating document management functionality into an apparatus that is already in common use with documents. Thus, users are not burdened with additional interactions with the document.

Page count sensor 220 is operable to sense the number of pages in a document. One example of page count sensor 220 is a capacitive device that uses the pages of the document as the dielectric. Thus, the more pages a document contains, the higher the capacitance will be. Various electrical properties, such as, for example, voltage, charge, or current, may be measured to determine the capacitance and, hence, number of pages. An implementation of a capacitive device will be discussed in more detail below. Another example of page count sensor 220 is a light transmission/reception system. In such a system, a light (e.g., from an LED) is transmitted through the pages of a document. Based on the strength of the light after it has traversed the document, a determination may be made of the number of pages of the document. Page count sensor 220 generates a signal representative of the number of pages sensed.

Environment sensor 230 may be any appropriate sensor for sensing a condition in, on, or in the vicinity of a document, conditions in the vicinity of the document being part of the document's environmental state. Examples of an environment sensor include a temperature sensor (e.g., resistive temperature device or thermocouple), an illumination sensor, (e.g., bolometer or charge-coupled device), a noise sensor (e.g., a microphone), and a movement sensor (e.g., accelerometer). Environment sensor 230 generates a signal representative of the environment condition sensed.

Computer 240 is coupled to page count sensor 220 and environment sensor 230, and includes memory 242 and a processor 246. Memory 242 may include random access memory (RAM), read-only memory (ROM), compact-disk read-only memory (CD-ROM), and/or any other appropriate device for storing information. Memory 242 includes instructions 244, according to which processor 246 operates. Processor 246 may be a complex instruction set computer (CISC), a reduced instruction set computer (RISC), a field programmable gate array (FPGA), or any other appropriate device for manipulating information in a logical manner. In particular implementations, computer 240 may be based on the Smart-Its Particles from TecO of Karlsruhe, Germany.

Wireless communication device 250 is coupled to computer 240 to wirelessly send data from and to wirelessly receive data for computer 240. Wireless communication device 250 may include a wireless transmitter, a wireless receiver, a wireless transceiver, and/or any other appropriate device for wireless sending and/or receiving information. Wireless communication device 250 may operate in any appropriate electromagnetic regime (e.g., RF or IR) and according to any appropriate protocol (e.g., IEEE 802.11, Bluetooth™, cellular, or IrDA). In particular implementations, wireless communication device 250 may sense the location of a document by detecting a wireless communication object (e.g., a gateway). In other implementations, wireless communication device 250 may sense the location of a document by receiving a location signal generated by another system component (e.g., a document tracking device).

Display device 260 is also coupled to computer 240. Display device 260 is operable to provide a visual indication of the status of physical document monitoring device 200 and/or the monitored document. Display device 260 may include light emitting diodes (LEDs), a liquid crystal display (LCD), a cathode ray tube (CRT) display, and/or any other appropriate device for providing a visual information.

The active components of document tracking device 200 may be powered by any appropriate power source. In certain implementations, a AAA battery or M battery may be used. Such a power source may provide operability for approximately one year if physicals triggers, such as, for example, document movement, are used for measuring and communicating.

In one mode of operation, the operations of physical document monitoring device 200 are initiated by instructions received through wireless communication device 240. The instructions may inform the physical document monitoring device of when to begin and end operations (e.g., a time period), the parameters of the monitored document (e.g., page type), the allowable state(s) of the monitored document, and the state data to be communicated to a document tracking device.

After registering with a document tracking device and being coupled to the document to be monitored (e.g., after a document is printed), physical document monitoring device 200 begins monitoring the document using page count sensor 220 and environment sensor 230. The sensors may make their measurements on a periodic, aperiodic, event-driven basis, or other appropriate basis.

When sensors 220-230 measure a state, they generate a signal representative thereof. Computer 240 receives the signals representing the measurements from the sensors and determines the sensed state. Computer 240 sends representations of the determined states to wireless communication device 250, for conveyance to the document tracking device. Computer 240 also determines whether a state is allowable. For example, the computer may determine that the document being monitored does not have the appropriate number of pages or that an environmental condition (e.g., illumination) is out of bounds. Illumination, for example, may be out of bounds if the document is placed in a bag or briefcase.

If a state is not allowable, the computer generates an indication that is presented by display device 260. The indication may be the activation of a light, the display of a text message, the display of a graphic symbol, or other appropriate indicator. Computer 240 also sends a signal indicating that an unallowable state has occurred to wireless communication device 250, for conveyance to the document tracking device.

Physical document monitoring device 200 may continue to monitor a document for any appropriate period of time. For example, the physical document monitoring device may monitor the document until an unallowable state is encountered or until a designated period of time has expired. The end of the monitoring may be specified in the instructions received though wireless communication device 250.

In other modes of operation, the physical document monitoring device 200 may also receive document meta-information (e.g., author, title, creation date, revision history, theme, and/or keywords) from the document tracking device. Computer 240 may store the data in memory 242 and provide the data on display device 250. Additionally, physical document monitoring device 200 may also receive state data for a non-physical version of the document from the document tracking device. The computer may use the state data of the non-physical version to validate the physical version of the document. For example, if the state data of the non-physical version indicates that it has been edited recently, computer 240 may determine that the physical version is no longer valid.

Although FIG. 2 illustrates one example of a physical document monitoring device, other implementations may include fewer, additional, and/or a different arrangement of components. For example, some implementations may not include a page count sensor and/or an environmental sensor.

As an additional example, some implementations may include a computer for each of the sensors. As a further example, some implementations may not include a display device. As another example, some or all of the instructions may be encoded on the processor.

In particular implementations, the page count sensor may include the document coupling device. For example, if the document coupling device is a binder clip, the page count sensor may use the sides of the bind clip as capacitive plates. The pages of the physical document to be monitored would then act as the dielectric. A voltage on the plate may then be measured to determine the number of pages in the physical document.

Figure 3A:
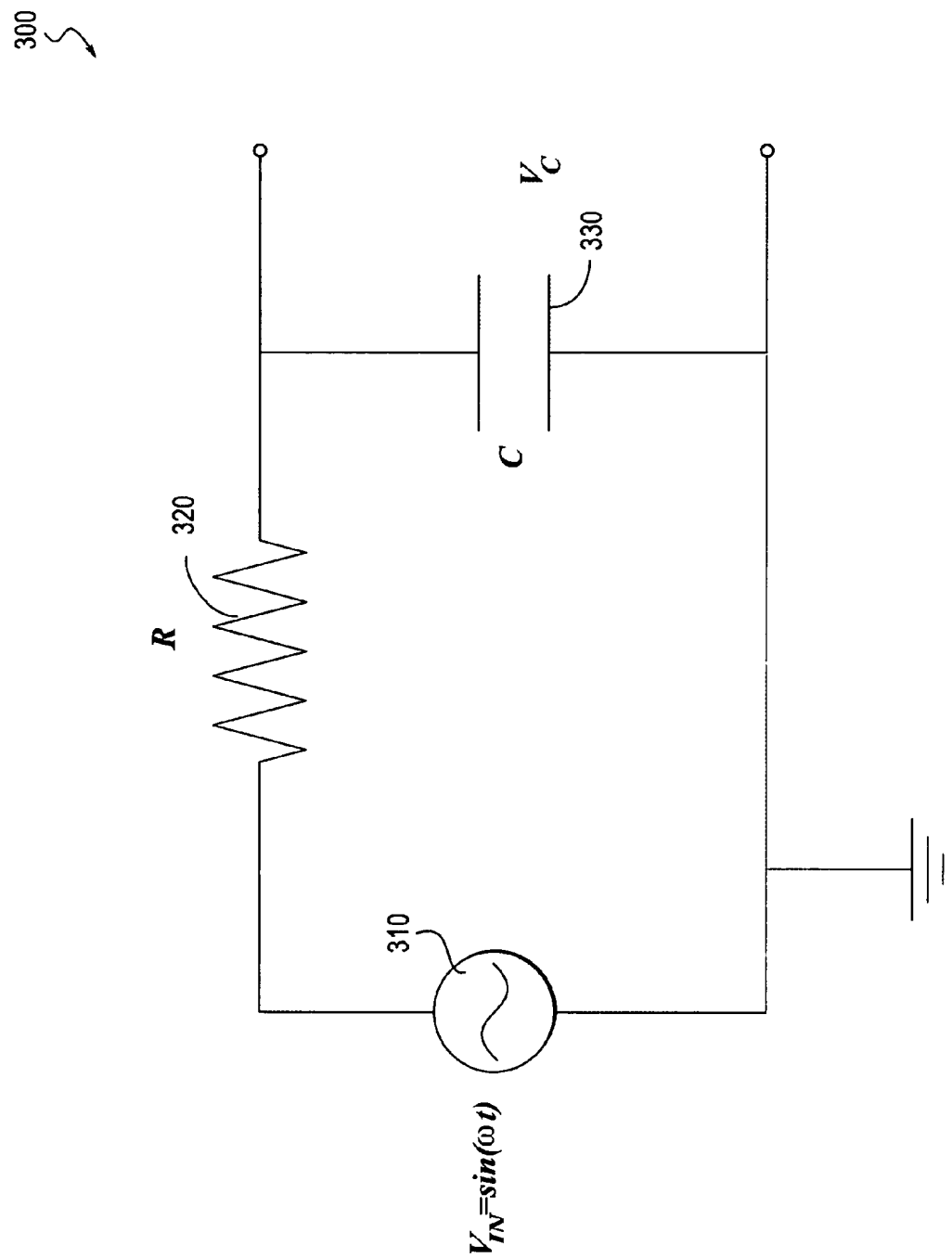
FIGS. 3A-B illustrate an embodiment of an electronic circuit for determining a document state.
Figure 3B:
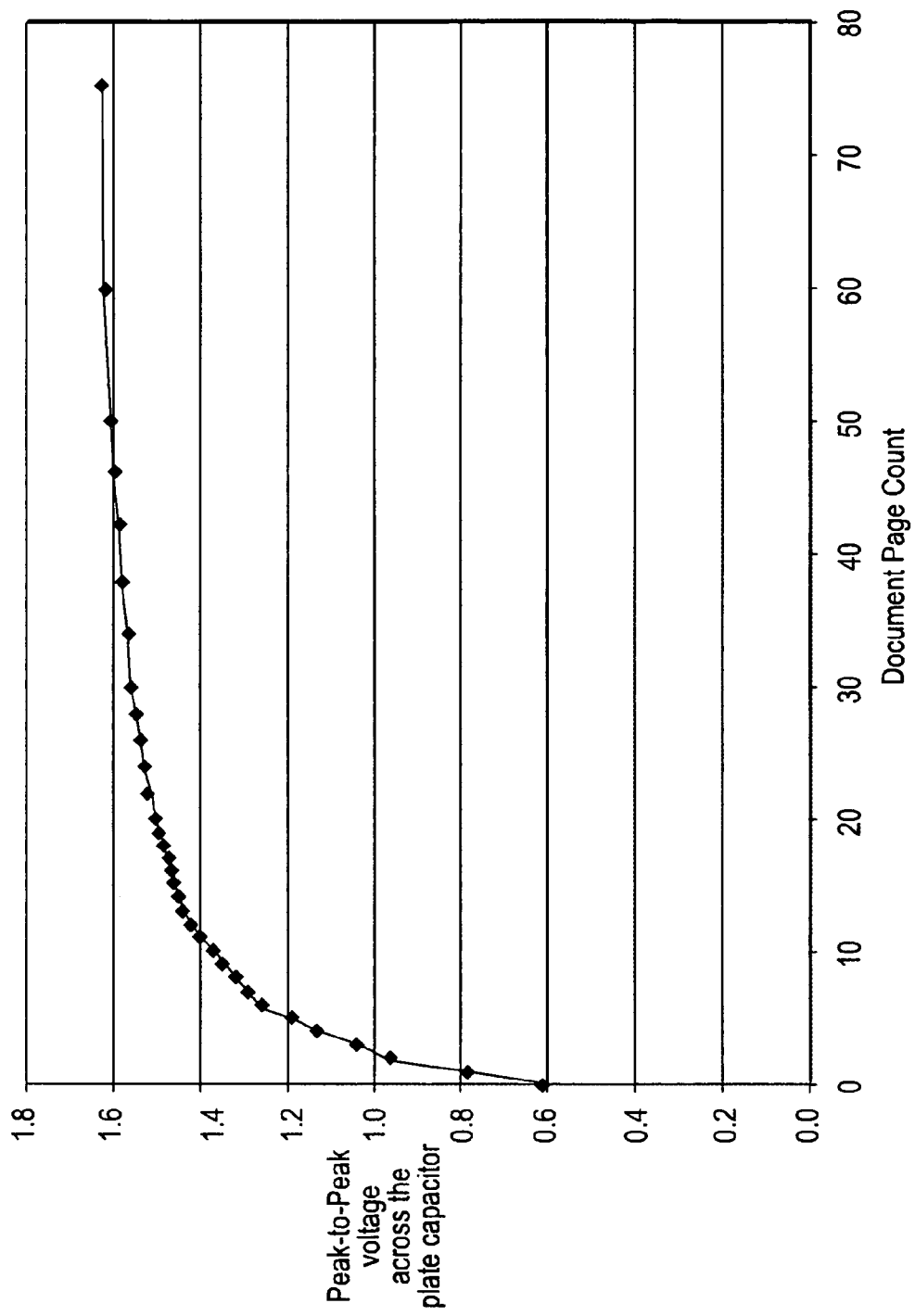

FIGS. 3A-B illustrate an electrical circuit 300 for analyzing a document using such a page count sensor. As can be seen in FIG. 3A, circuit 300 has a sinusoidal voltage input 310, a resistor 320, and a capacitor 330. Capacitor 330 is formed by the panels of the binder clip acting as the capacitor plates and the document pages acting as the dielectric. Because the number of pages in the document affects the dielectric constant, measuring the voltage across capacitor 330 provides an indication of the number of document pages. The relationship of the voltage across capacitor 330 to voltage input 310 may be expressed as:

$$V_C = V_{IN} \frac{Cjw}{R + Cjw}$$

FIG. 3B shows the voltage across the capacitor for one implementation. The change in the voltage across the capacitor due to fewer or additional pages in a document varies the most when a document only contains a few pages. However, the change in the voltage across the capacitor due to fewer or additional pages does continue to change even for documents with many tens of pages. Storing a representation of the curve may assist in determining changes in page count and in determining page count. Note that the accuracy of the page count measurement may degrade for documents containing pages of varying thickness.

A physical document monitoring device may also recognize other conditions with such a document coupling device. For example, the physical document monitoring device may recognize that the clip is empty or that the clip is open.

Figure 4:
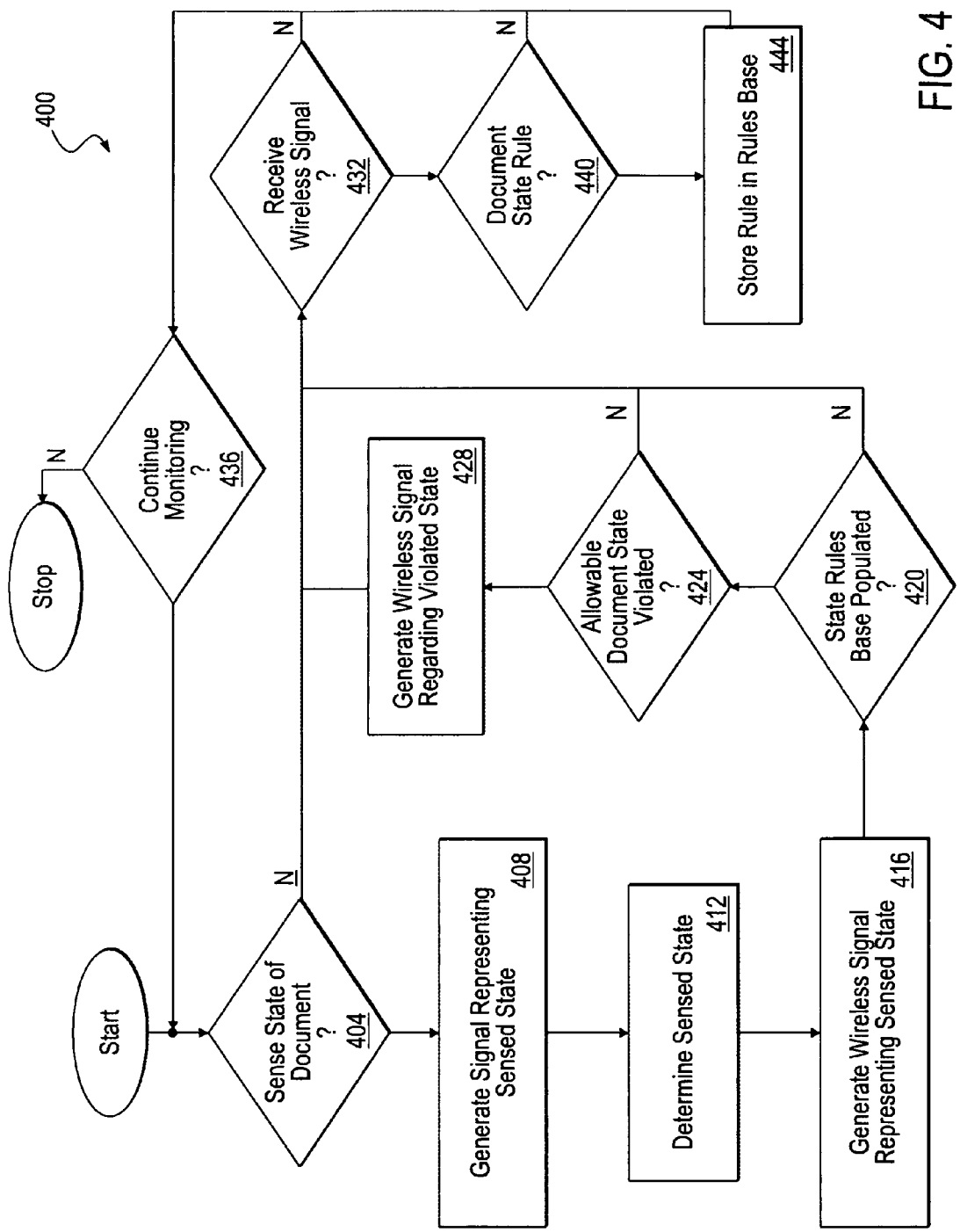
FIG. 4 is a flow chart illustrating an embodiment of a process for document management.

FIG. 4 is a flow chart illustrating a process 400 for document management. Process 400 may, for example, describe the operations of physical document monitoring device 120 of FIG. 1.

The process begins with determining whether a state of a document has been sensed (decision block 404). The state of a document may be sensed continuously, periodically, aperiodically, on an event-driven basis, or other otherwise. If a state of a document has been sensed, the process calls for generating a signal (e.g., analog, or digital) representing the sensed state (function block 408), and determining the sensed state (function block 412). The sensed state may be determined using a formula, a table look up, or otherwise.

The process also calls for generating a wireless signal, which may be in the form of a wireless message, representing the sensed state (function block 416), and determining whether a state rules base has been populated (decision block 420), the state rules base expressing the allowable states for the monitored document. If the state rules base has been populated, the process calls for determining whether an allowable document state has been violated (decision block 424). An allowable document state may be violated, for example, if the sensed state is outside allowable bounds. If an allowable document state has been violated, the process calls for generating a wireless signal regarding the violated state (function block 428).

Returning to decision block 404, if a document state has not been sensed, the process calls for determining whether a wireless signal has been received (decision block 432). If a wireless signal has not been received, the process calls for determining whether monitoring should continue (decision block 436). Monitoring may be discontinued, for example, if an allowable state has been violated. If monitoring should not continue, the process is at an end. If, however, monitoring should continue, the process calls for returning to check for a sensed document state (decision block 404). Checking for a sensed document state and a received wireless signal may occur any number or times.

If, however, a wireless signal has been received, the process calls for determining whether the signal represents a document state rule (decision block 440). If a document state rule is represented, the process calls for storing the rule in the document state rules base (function block 444). The rule may be checked against subsequently sensed and determined document states.

Although FIG. 4 illustrates one implementation of a process for document management, other implementations may include fewer, additional, and/or a different arrangement of operations. For example, a process for document management may include an initialization procedure. During an initialization procedure, a physical document monitoring device may be associated with a document by a document tracking device. Also, the state rule base may be populated. Furthermore, document meta-information may be received. As another example, a process for document management may call for generating a visual display of the monitoring status (e.g., active, allowable state violated, change in non-physical-version state, etc.) and/or the document state (e.g., page count, environmental condition, state violation, etc.). As an additional example, a process for document management may not call for generating a wireless signal representing a sensed state, As a further example, a process for document management may not call for determining whether an allowable state has been violated. Such a determination may, for example, be accomplished by a document tracking device. As another example, information regarding a non-physical version (e.g., document meta-information) may be received and stored. This information may be accessed through the document monitoring device, a properly equipped PDA, or other appropriate device.

Figure 5:
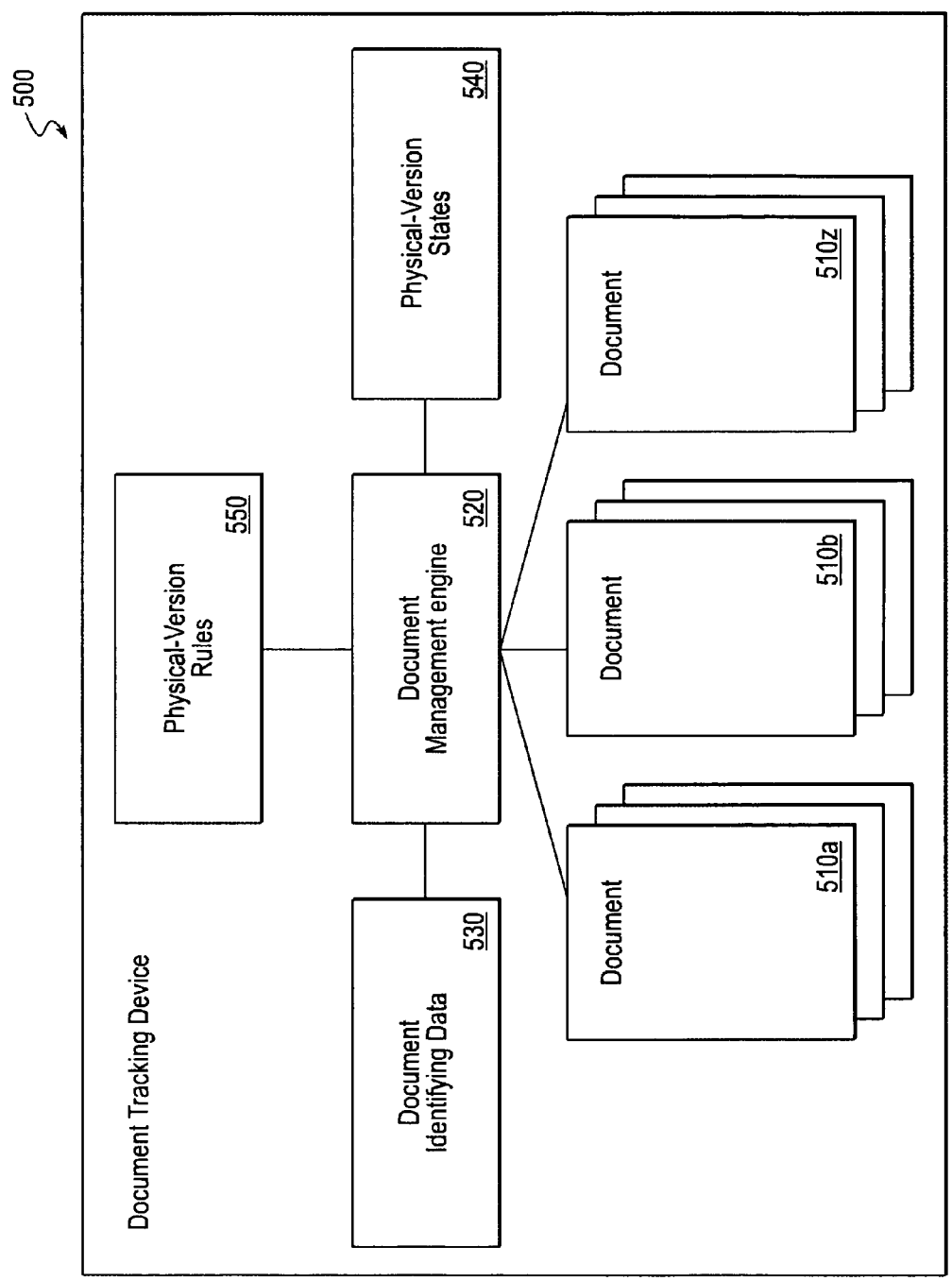
FIG. 5 is a block diagram illustrating an embodiment of a document tracking device for the system in FIG. 1.

FIG. 5 illustrates a document tracking device 500. Document tracking device 500 may be similar to document tracking device 130 in FIG. 1. Document tracking device 500 includes non-physical documents 510, a document management engine 520, physical-version states 540, physical-version rules 550, and document meta-information 530.

Non-physical documents 510 include any non-hard-copy representation of a document. Non-physical documents 500 may be maintained in any appropriate media and in any appropriate format. For example, the documents may be stored in magnetic and/or optical memory. Furthermore, the documents may be word processing documents (e.g., Microsoft® Word, Corel Wordperfect®, or ASCII documents), spreadsheet documents (e.g., Microsoft® Excel or Lotus® 123 documents), presentation documents (e.g., Adobe® PDF, Microsoft® PowerPoint, or Tagged Image File Format (TIFF) documents), or other appropriate document format. Typically, each of documents 510 is stored as an individual file, although it need not be.

Document management engine 520 is responsible for managing access to non-physical documents 510. To manage access to the documents, document management engine 520 may include a file management system. Using a file management system, document management engine may determine the states of non-physical documents 510 (e.g., size, last modification time, etc.), allow access to non-physical documents 510, and track the access and state. Document management engine 520 could also include a database to assist with or perform these operations. Document management engine 520 is also responsible for determining document meta-information 530 (e.g., author, title, creation time, etc.). Furthermore, document management engine 520 is responsible for storing physical-version states 540, which may have been received from physical document monitoring devices, and physical-version rules 550, which may have been received from a user interface device. Document meta-information 530, physical-version states 540, and physical-version rules 550 may, for example, be stored in one or more databases.

Any of a variety of hardware devices may be used to implement document tracking device 500. For example, the document tracking device may include memory, a processor, and a network interface card (NIC). The memory may include RAM, ROM, CD-ROM, and/or any other appropriate information storage device. The processor may be CISC, a RISC, FPGA, or any other device for manipulating information in a logical manner. The NIC may be an Ethernet card, a modem, an Asynchronous Transfer Mode (ATM) card, a transceiver, or any other appropriate device for sending and receiving information from a communication network.

In one mode of operation, document tracking device 500 begins tracking a physical-version of a document upon receiving a physical-document registration request. A physical-document registration request may, for example, include an identification of the document to be tracked and the physical document monitoring device that is to monitor the document.

Upon receiving a physical-document registration request, the document tracking device may perform initialization operations for the tracking. These operations may include establishing a location (e.g., memory location and/or database record) for storing tracking information. Also, these operations may include negotiating with the physical document monitoring device regarding the document states to be monitored. Additionally, these operations may include determining whether any rules for the physical version exist. The rules may be pre-stored by the document tracking device and/or received during the registration process. If rules are available, the document tracking device may establish procedures to monitor the rules.

Once the registration procedure is complete, the document tracking device waits for a signal representing a state of the physical version. The signal may arrive in the form of one or more messages. When the document tracking device receives such a signal, it stores the state and determines whether any rules for the physical version exist. If the physical version has rules, the document tracking device determines whether an allowable document state has been violated. If an allowable document state has been violated, the document tracking device may record a violation.

In particular implementations, the document tracking device may also store a non-physical version of the document as one of documents 510. If the document tracking device stores a non-physical version of the document, the document tracking device may associate the state information of the physical version with the non-physical version. Also, the document tracking device may send information regarding the state of the non-physical version to the physical document monitoring device. Thus, information regarding the non-physical version (e.g., modified, deleted, accessed, etc.) may be available at the physical version.

Although document tracking device 500 illustrates one example of a document tracking device, other implementations may have fewer, additional, and/or a different arrangement of components. For example, a document tracking device may have a separate engine for tracking physical versions of documents. As another example, a document tracking device may not store non-physical versions of documents. As an additional example, a document tracking device may not store physical-version rules.

Figure 6:
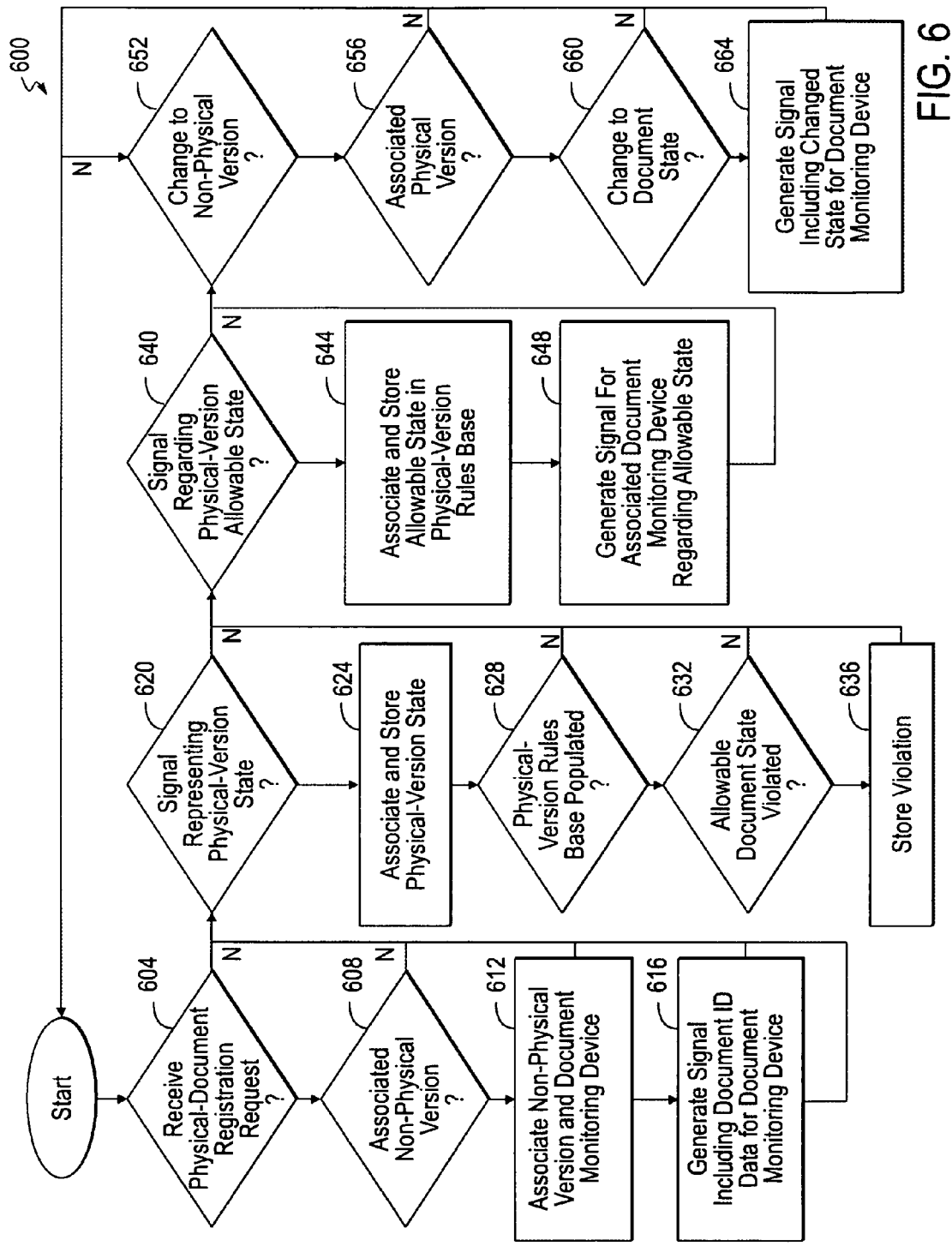
FIG. 6 is a flow chart illustrating an embodiment of a process for document management.

FIG. 6 is a flow chart illustrating a process 600 for document management. Process 600 may, for example, describe the operations of document tracking device in 130 FIG. 1.

The process begins with determining whether a physical-document registration request has been received (decision block 604). A physical-document registration request may, for example, include an identification of the document to be managed and the physical document monitoring device that is to monitor the document. If a physical-document registration request has been received, the process calls for determining whether a non-physical version of the document exists (decision block 608). If a non-physical version of the document does not exist, the registration procedure is at an end. If, however, there is a non-physical version of the document, the process calls for associating the non-physical version and a physical document monitoring device that is to perform the monitoring (function block 612). The association may, for example, be accomplished by associating an identifier (e.g., Electronic Serial Number (ESN), network address, etc.) for the physical document monitoring device that is to monitor the physical version of the document with the non-physical version of the document. The process also calls for generating a signal, which may be in the form of a message, including meta-information for the document to be monitored for the associated physical document monitoring device (function block 616). The signal may then be sent to the associated physical document monitoring device.

If the registration procedure is complete, or if the registration procedure is not undertaken, the process calls for determining whether a signal (e.g., a message) representing a state of a physical version of a document has been received (decision block 620). If such a signal has been received, the process calls for associating the physical-version state with a non-physical version of the document and storing the state (function block 624). The process also calls for determining whether a physical-version rules base has been populated (decision block 628). If a physical-version rules base has not been populated, the physical-version state receipt procedure is at an end. If, however, the physical-version rules base has been populated, the process calls for determining whether an allowable document state has been violated (decision block 632). Determining whether an allowable document state has been violated may, for example, be accomplished by comparing the received physical-version state against the rules in the rules base. If an allowable document state has been violated, an indication of the violation is stored (function block 636).

If the physical-version state receipt procedure is complete, or if a physical-version state has not been received, the process calls for determining whether a signal (e.g., a message) regarding a physical-version allowable state has been received (decision block 640). If a signal regarding a physical-version allowable state has been received, the process calls for associating the allowable state with a non-physical version of the document and storing the allowable state in the physical-version rules base (function block 644). The process also calls for generating a signal for the associated physical document monitoring device regarding the physical-version allowable state (function block 648).

If the physical-version allowable state receipt procedure is complete, of if a physical-version allowable state has not been received, the process calls for determining whether a change to a non-physical version of a document has occurred (decision block 652). This may, for example, be accomplished by determining whether the document has been accessed or edited or if a process has been annulled. If a change to a non-physical version of a document has occurred, the process calls for determining whether an associated physical version of the document exists (decision block 656). If, however, an associated physical version of the document does exist, the process calls for determining whether a change to the non-physical-version state has occurred (decision block 660). A change to the state may include an increase or decrease in the size of the document, a change in the last-modified time, or any other appropriate state change. If a change to the non-physical-version state has occurred, the process calls for generating signal including the changed non-physical-version state for the associated physical document monitoring device (function block 664).

If the non-physical version state change procedure is complete, or if a change has not occurred to a non-physical version, the process calls for returning to check whether a physical document registration request has been received (decision block 604). Note that more than one physical document may be managed at any one time. Determining whether a physical document registration request has been received (decision block 604), whether a signal representing a state of a physical version of a document (decision block 620), whether a signal regarding an allowable state of a physical version of a document (decision block 640), and whether a change to a non-physical version of a document has occurred (decision block 652) may occur any number of times.

Although FIG. 6 illustrates one implementation of a process for document management, other implementations may include fewer, additional, and/or a different arrangement of operations. For example, a process for document management may include populating the state rule base or not generating a signal including document identification data during the initialization process. As another example, a process for document management may call for receiving a request for the physical-version state. The process may respond by generating a signal containing the state data, possibly including whether an allowable state violation has occurred. As an additional example, a process for document management may not call for determining whether an allowable state has been violated. This may occur, for example, if a physical document monitoring device will perform such an operation. As a further example, a process for document management may call for tracking a physical version of a document even if no non-physical version exists. As another example, a process for document management may allow for determining whether a physical document registration request has been received (decision block 604), whether a signal representing a state of a physical version of a document has been received (decision block 620), whether a signal regarding an allowable state of a physical version of document has been received (decision block 640), and whether a change to a non-physical version of a document has occurred (decision block 652) in any order, contemporaneously, simultaneously, or otherwise.

As a further example, violations of an allowable state may be communicated to the associated document monitoring system.

Figure 7:
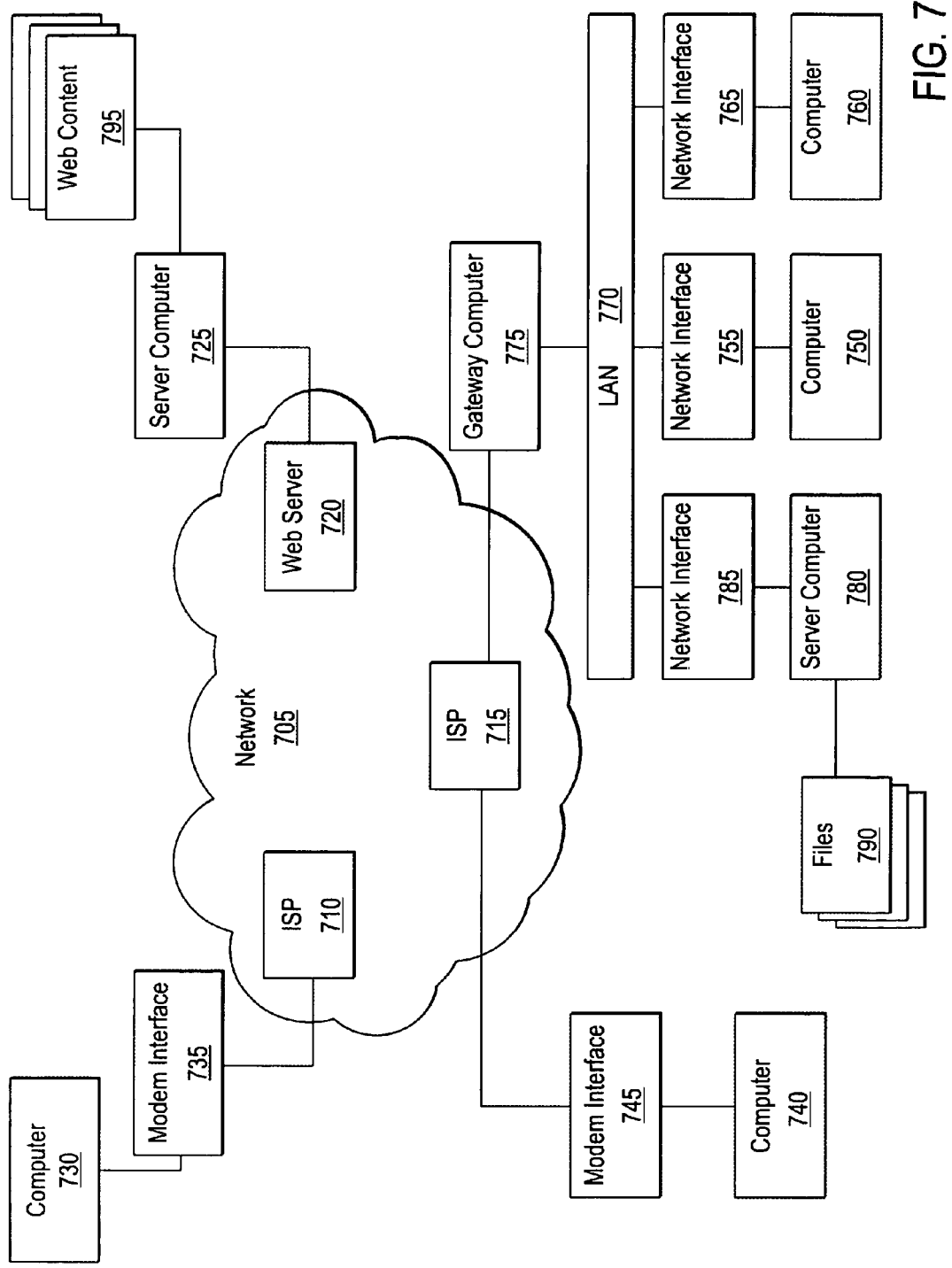
FIG. 7 illustrates an embodiment of a network which may be used in conjunction with proximity sensing.
Figure 8:
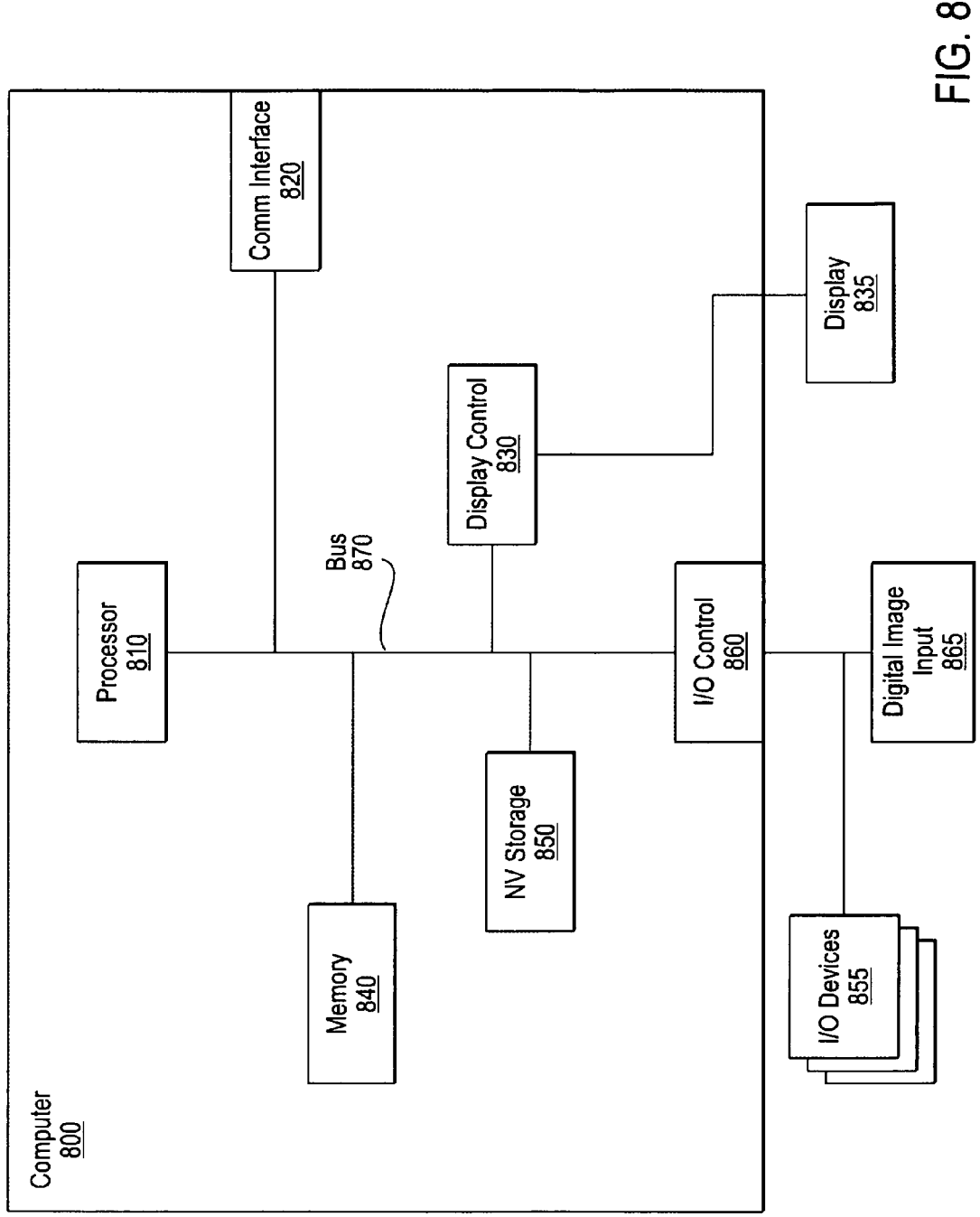
FIG. 8 illustrates an embodiment of a machine which may be used in conjunction with proximity sensing.

The following description of FIGS. 7-8 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG.

7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 which can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 8 shows one example of a conventional computer system that can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered to be part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can also include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
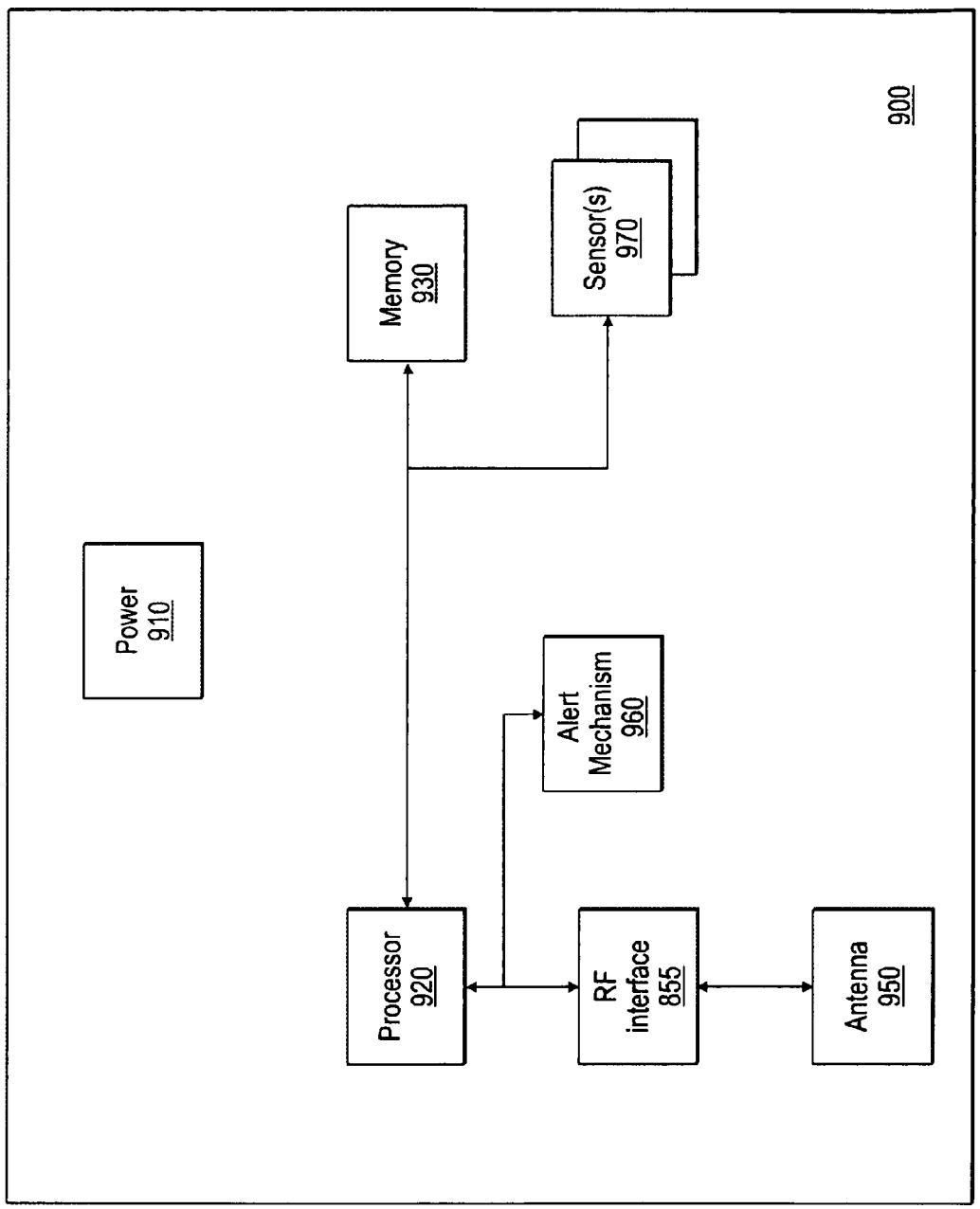
FIG. 9 illustrates an embodiment of an apparatus which may be used in some embodiments of a process of proximity sensing.

Whether a computer or similar system is present or not, proximity sensing may be implemented. FIG. 9 illustrates an embodiment of an apparatus which may be used in some embodiments of a process of proximity sensing. Device 900 is an embodiment of a device, such as a Mote developed by Intel and U.C. Berkeley or a Smart-It developed by TecO and Karlsruhe University for example, as such devices may be modified for use in proximity sensing. In the embodiment illustrated, processing logic, memory, communications interface(s), sensor(s), and power supply are provided. Exactly what is included in various embodiments may not be uniform, as different applications may or may not require sensors or alert mechanisms for example.

As illustrated, device 900 includes a power supply 910, which may involve, for example, a 1.5 V battery (AA or UM6 for example), and a regulating device such as may be incorporated in a power management or voltage regulating integrated circuit. Processor 920 may be either an "off-the-shelf" processor or an application specific processor (such as an ASIC for example), and may include dedicated circuitry such as that found in digital signal processors for example. Coupled to processor 920 is memory 930, which may be used to store data and instructions, either in a volatile way (such as in RAM for example), or in a non-volatile way (such as in FLASH EPROM for example). Also coupled to processor 920 is sensor (or sensors) 970, which may be used to sense some aspect of the external environment (such as temperature, pressure, etc.) or to sense some specific property (such as the number of pages using the capacitive sensor of FIG. 3A for example).

Additionally, alert mechanism 960 is coupled to processor 920. Alert mechanism 960 may be used to alert an attending user to a hazardous condition, to provide general status output, or to otherwise interact with a user or with humans in general. Alert mechanism 960 may operate as a user interface in some embodiments, not only providing output (such as alert or status for example), but also allowing for input. Alternatively, a sensor 970 may be provided in the form of a button or similar input device for example, which received human or other input and allows processor 920 to receive an electronic analog of such input.

To allow for communication with other devices (such as other Smart-Its or Motes for example), or with base stations, networks, and other external processing devices, RF interface 940 (radio frequency interface) and antenna 950 are coupled to processor 920. RF interface 940 may receive signals from processor 920 and transform those signals into an RF format for transmission through antenna 950: Similarly, antenna 950 may receive RF signals which are presented to RF interface 940, with RF interface 940 in turn transforming those signals into a format useful by processor 920. In some embodiments, RF signals are transmitted at frequencies such as 433 MHz or 868 MHz for example.

Figure 10:
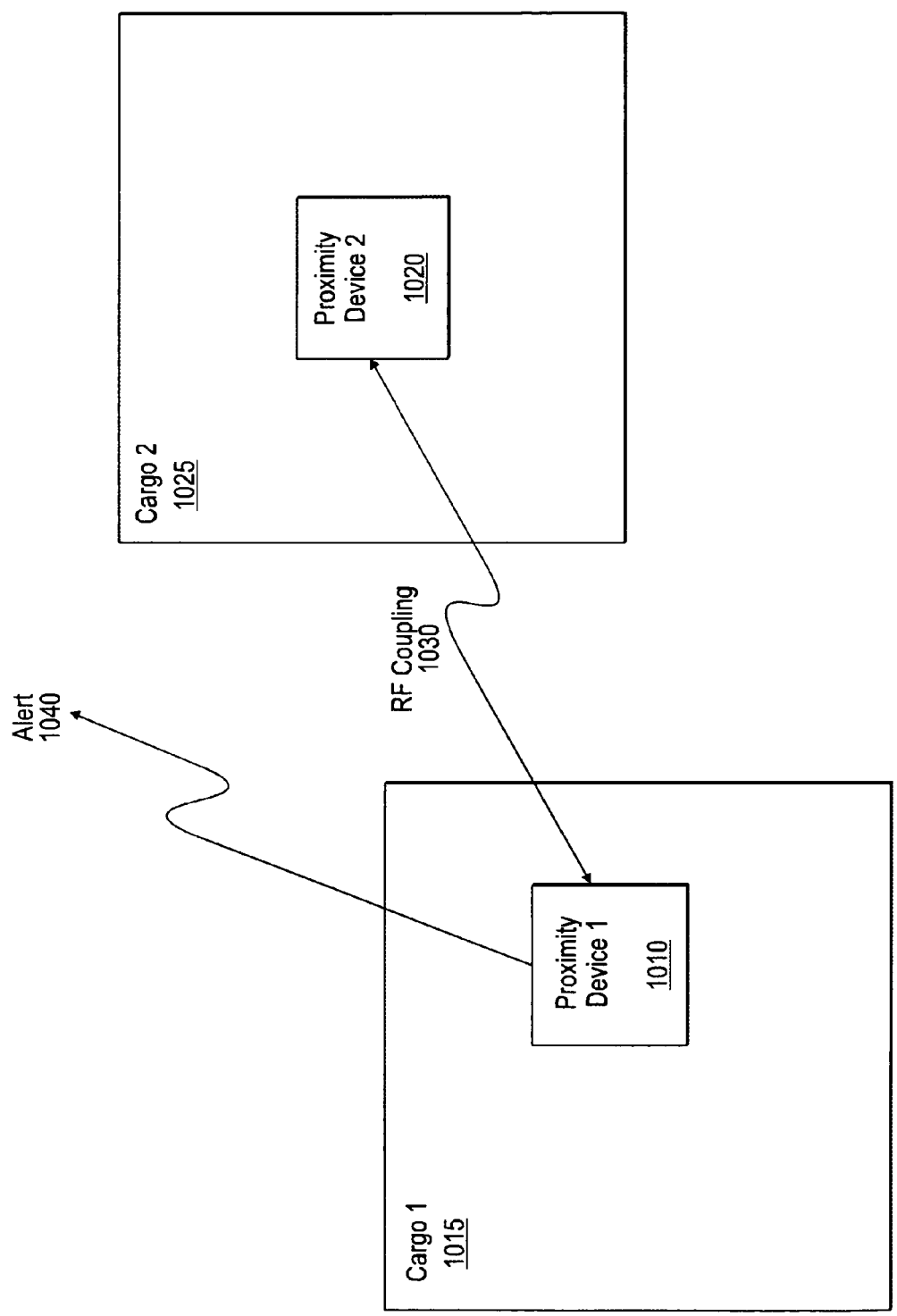
FIG. 10 illustrates an embodiment of a pair of proximity sensing devices as they may be used.

With this communications capability, the devices may communicate when used in proximity. FIG. 10 illustrates an embodiment of a pair of proximity sensing devices as they may be used. The proximity sensing devices represent a particular embodiment of the device illustrated in FIG. 9. Proximity sensing devices have programmed in their memory an identification of what material (or materials) they are associated with (such as an identification number or set of identification numbers for example). Along with the identification number, programmed in the memory are a set of excluded materials (by similar identification numbers for example) which may not be near the identified material and/or a set of required materials which must be near the identified material.

A related master table of materials and corresponding identifiers is preferably available, allowing for uniform systems or identifying materials. CAS numbers of the American Chemical Society may be useful for such identification purposes, for example. The proximity sensing devices are then attached to a container or pallet of the identified material for shipment or storage. When other materials with similar proximity sensing devices are nearby, the proximity sensing devices may communicate through use of radio frequency communications.

Thus, a first cargo 1015, such as a box, pallet, drum or other container for example, may have a first material with a first set of identification numbers programmed into a first proximity device 1010 which is attached to cargo 1015. Additionally, a set of requirements and/or exclusions may also be programmed into first proximity device 1010. When a second cargo 1025 is brought into proximity with first cargo 1015, the first proximity device 1010 may communicate via RF coupling 1030 (a radio link for example) with a second proximity device 1020.

Second proximity device 1020 may be programmed with a second set of identification numbers associated with a second material of cargo 1025, along with a corresponding set of requirements and/or exclusions. The communication along RF coupling 1030 may involve an exchange of sets of identification numbers from the proximity devices (1010, 1020). After the exchange, each proximity device (1010, 1020) may then compare the received information with the stored lists of requirements and/or exclusions.

If the first proximity device 1010 detects that the material of cargo 1025 should not be the material of cargo 1015, it may then send out alert 1040 (such as sounding a buzzer or flashing a light for example) to advise any nearby humans of a hazardous condition. Examples of alert devices may include the aforementioned buzzer or flashing light, or may also include a set of three LED in traditional stoplight colors (such as red, yellow and green for example), a speaker, or other perceptible alert devices for example. Examples of such hazardous conditions might be placement of a container of water near a container of lithium for example, or placement of two containers of uranium nearby each other for example. An example of a required condition may involve requiring that uranium be surrounded by containers holding lead for example. Moreover, no additional equipment beyond the two proximity devices is required in such an embodiment to allow for sensing and alert to a hazardous condition. Additionally, range limitations on how far/how close material can be may be set by tuning the power output and sensitivity of the transmitter and receiver of each proximity device for example.

Figure 11:
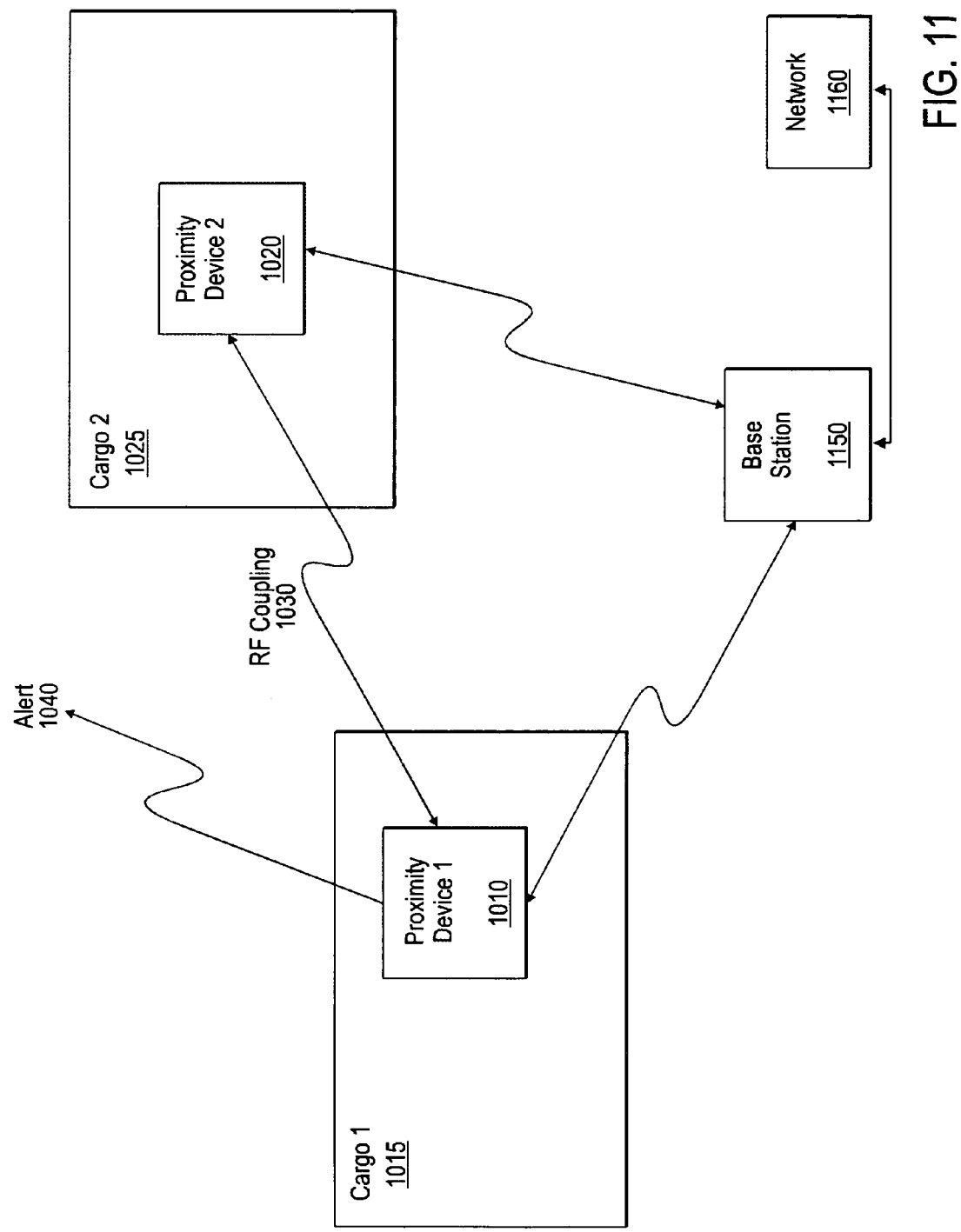
FIG. 11 illustrates an alternate embodiment of a pair of proximity sensing devices as they may be used.

Just because a base station or other equipment is not required does not mean that nearby equipment must be ignored. FIG. 11 illustrates an alternate embodiment of a pair of proximity sensing devices as they may be used. Base station 1150 is coupled by radio links to both of the first proximity sensor 1010 and the second proximity sensor 1020. Accordingly, base station 1150 may communicate with each proximity sensor. For example, base station 1150 may receive a message encoding notice of the alert 1040, which may then be passed to an operator of base station 1150 or to network 1160, and then on to a computer or other networked device. Moreover, network 1160 may allow for notification of a predetermined person, such as an on-call attendant, through use of a pager or cellular telephone call for example.

Additionally, proximity sensing devices 1010 and 1020 may record information about what materials came in proximity during transit or as material was shifted around within a warehouse for example. A log or similar list of such encounters may be communicated to base station 1150 and thence to network 1160, allowing for analysis and storage. Similarly, if one (or both) of proximity sensing devices 1010 and 1020 include other sensors (such as temperature or altitude sensors for example), data from such sensors may be provided to base station 1150 and network 1160. Thus, the proximity sensors may include additional information beyond proximity information/alerts, and may have applications beyond warning when proximity violations occur.

Figure 12:
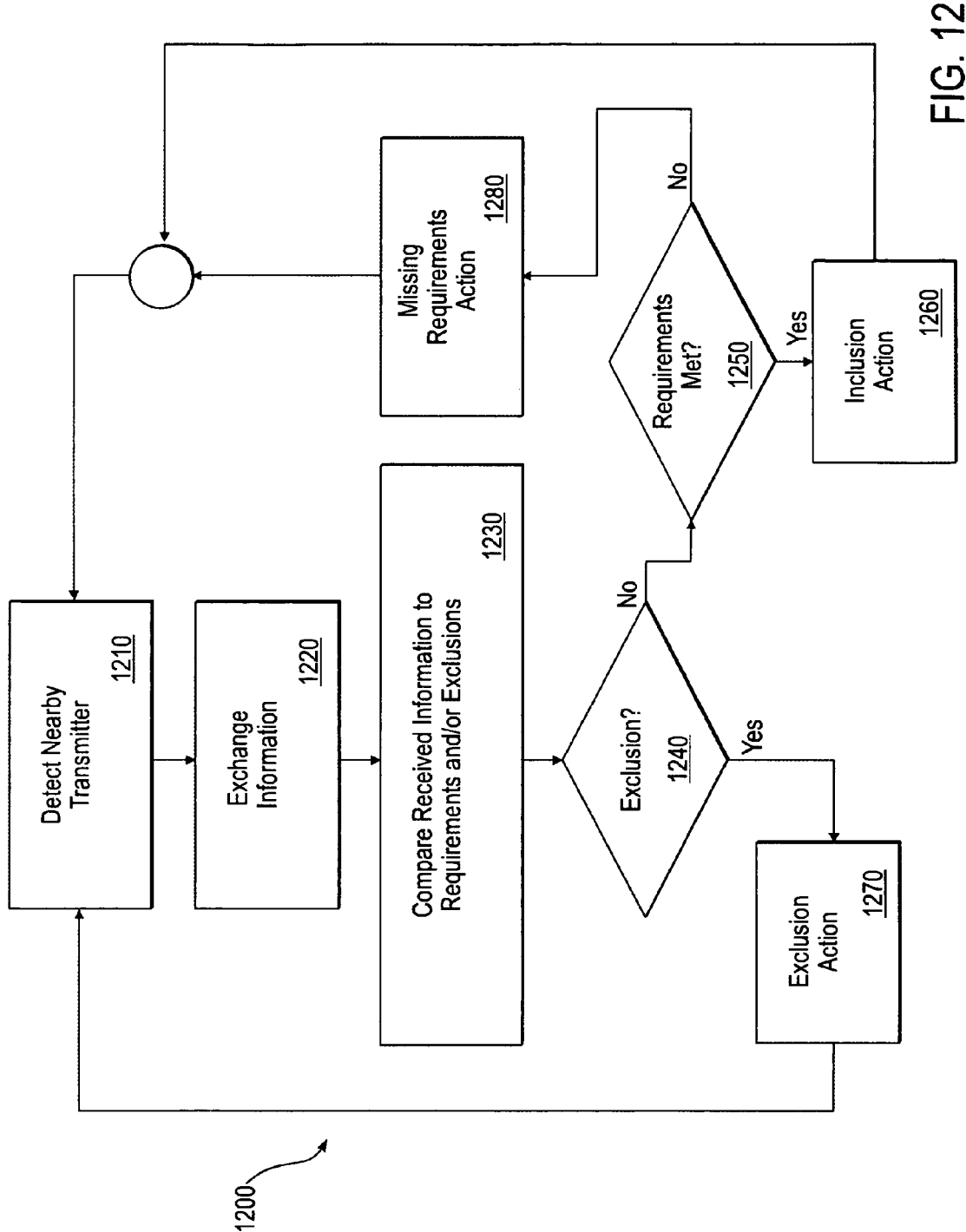
FIG. 12 illustrates an embodiment of a process of proximity sensing.

The process by which such sensing may occur has received some treatment already. However, a more involved explanation may be beneficial. FIG. 12 illustrates an embodiment of a process of proximity sensing. Such a process (and all processes illustrated herein) may include a set of modules which may be implemented as steps or acts in series or parallel fashion, as devices or components which perform the function of the module, or as some other form of process module for example. Similarly, while processes may be illustrated in stepwise or series format, or alternatively in some parallel format, the order of operations and series or parallel nature of operations need not be identical in all embodiments to the processes illustrated.

Process 1200 includes detecting a transmitter, receiving or exchanging information, comparing received information to stored information, and acting on results (exclusion/requirement) of the comparison. At module 1210, a nearby transmitter (within a predetermined approximate range of detection) is discovered. A periodic pulse emitted from a device may be involved in such a process. At module 1220, information is exchanged with (or at least received from) the nearby transmitter, preferably including identification information for an associated cargo. At module 1230, the information received is compared with stored information about requirements and/or exclusions for cargo associated with the receiving proximity sensor. At module 1240, a determination is made as to whether the two cargoes are to be excluded from one another. If so, at module 1270, an exclusion action (such as sending an alert) is performed, and the process then returns to module 1210.

If no exclusion condition is detected, then at module 1250, a determination is made as to the outcome of comparison to requirements for the cargo in question. If all requirements are met, at module 1260, an inclusion action is performed, such as indicating on a display that requirements are met, or sounding an all clear tone for example. If requirements are not met, then at module 1280, a missing requirements action is performed, such as providing an audible alert or a warning message on a display for example. From either module 1260 or 1280, the process then proceeds back to module 1210.

Process 1200 also may illustrate a more generic embodiment of a process of using devices such as Motes or Smart-Its. In general, detection of a nearby device at module 1210 is well understood. Information exchanged at module 1220 may be of various forms, typically involving some form of identification or authentication. Comparison with exclusion or requirements at module 1230 may relate to checking for proper authentication, identity, or some other form of information related to exclusive or inclusive use/access. An exclusion action at module 1270 may relate to indicating a person is not allowed through a door (with security requirements for example). Similarly, an inclusion action at module 1260 may relate to unlocking such a door. Moreover, for an area requiring an escort or requiring multiple people inside (such as hazardous or restricted areas for example), a missing requirements action at module 1280 may relate to sounding a tone or broadcasting a warning about failure to meet such requirements (and may also include locking a door until conditions are met for example). Thus, the process may be adapted in a variety of ways.

Figure 13:
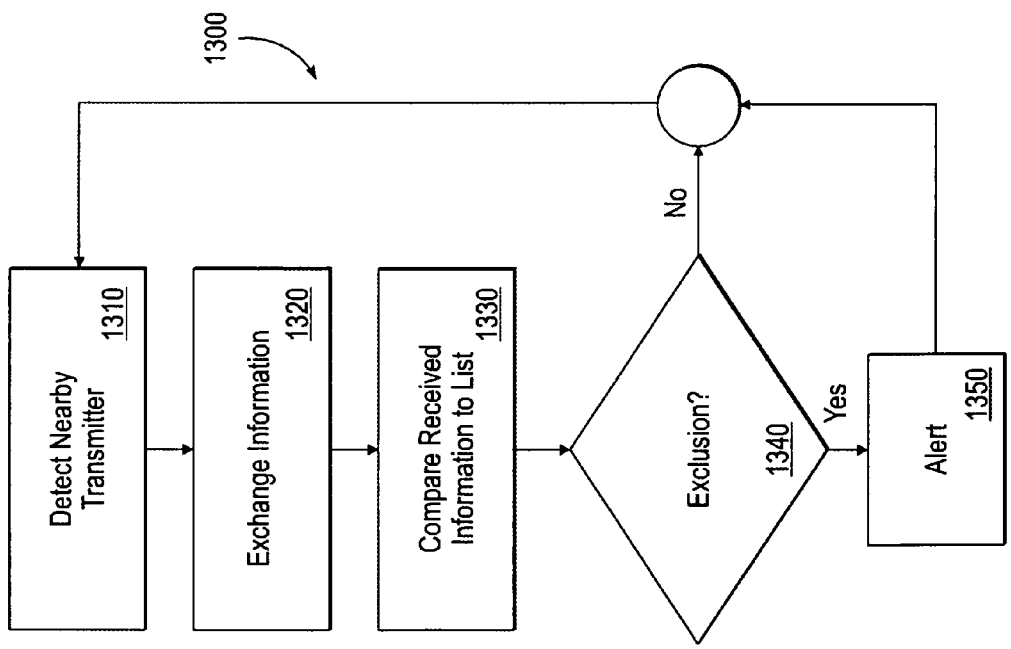
FIG. 13 illustrates an alternate embodiment of a process of proximity sensing.

FIG. 13 illustrates an alternate embodiment of a process of proximity sensing. Process 1300 relates to one specific embodiment related to the generic process 1200, namely exclusion of materials in a proximity sensing process. At module 1310, a nearby transmitter is detected. At module 1320, information is exchanged, or received, relating to the nearby transmitter and associated proximity sensor. At module 1330, the received information is compared with stored information to determine if the received information relates to cargo which should not be near the cargo of the receiving proximity sensor. At module 1340, the results of the comparison of module 1330 are evaluated. If exclusion is appropriate (the material of the transmitting proximity sensor should not be near the material of the receiving proximity sensor), an alert is sounded or otherwise provided at module 1350. The process then returns to module 1310.

Figure 14:
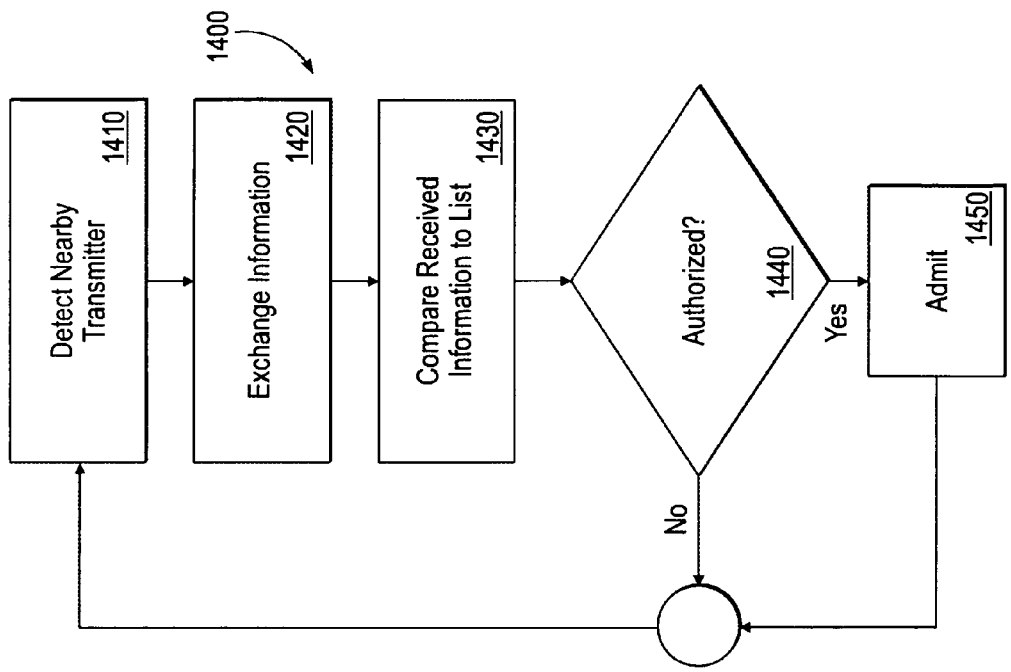
FIG. 14 illustrates an embodiment of a process of access control.

Another specific embodiment of the general process of FIG. 12 relates to access control through a door, for example. FIG. 14 illustrates an embodiment of a process of access control. Process 1400 may use a standalone proximity sensor device, preferably with either a list of authorized people (encoded as identifiers receivable from personal proximity sensors) or as a list of authorized identifiers which may be issued to single people or groups of people in the form of proximity sensors. In the standalone form, the proximity sensor device may be insulated from network or power disruptions (with its own power source for example), and may therefore allow for additional reliability for example.

Process 1400 includes, at module 1410, detecting a nearby proximity sensor (such as one carried by an individual seeking admittance for example). At module 1420, information is exchanged and/or received from the nearby proximity sensor. At module 1430, the information received is compared with a stored list of allowable identifiers for example. At module 1440, the results of the comparison are evaluated (is the nearby proximity sensor broadcasting an authorized identifier?) At module 1450, if authorization is correct, the associated door may be unlocked and/or opened. Whether authorization occurs or not, the process then returns to module 1410.

Figure 15:
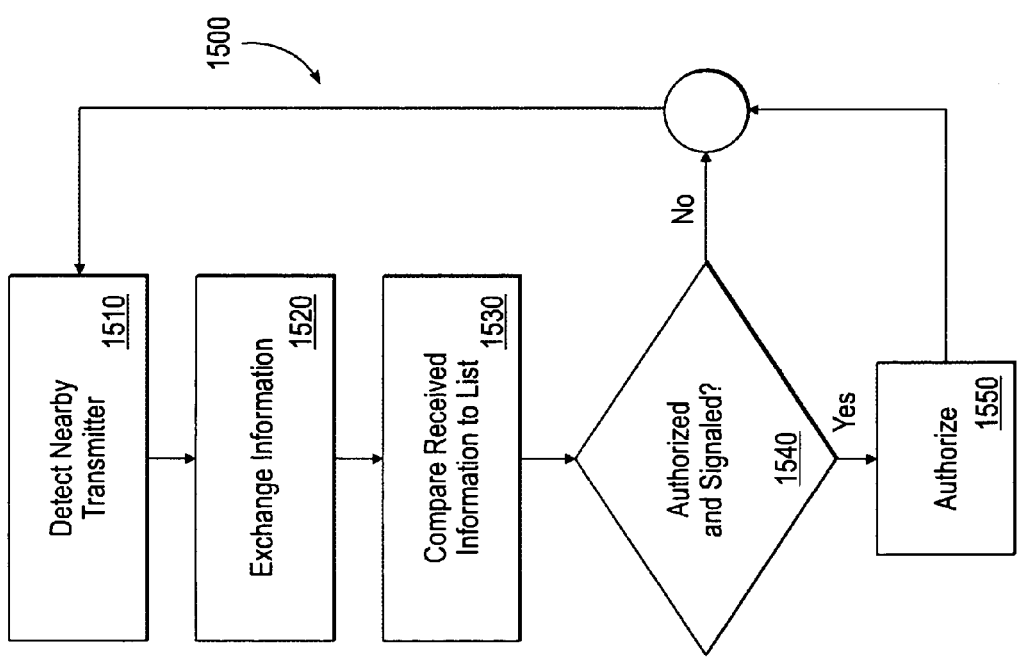
FIG. 15 illustrates an embodiment of a process of document control and authentication.

Yet another specific embodiment of the general process of FIG. 12 relates to document control and authentication, for example. FIG. 15 illustrates an embodiment of a process of document control and authentication. In one embodiment, each person who may sign (digitally or physically) a document (and perhaps all employees) carries a personal device along the lines of a proximity sensor, including an identifier for the authorized carrier. Digital signatures for a document may be accomplished by assuring the person is nearby (with a very short range for sensing nearby transmitters for example) and receiving a signal from either a user interface of a receiving proximity sensor (a button for example) or from the transmitting proximity sensor (as triggered by a user, for example). Physical signatures may be tracked by logging in an associated proximity sensor the presence of an authorized signer at a time contemporaneous with the time (or date for example) at which the document is purported to have been signed. The document management system of FIGS. 1-6 may be useful in conjunction with this process, as a document holding and sensing device may also be programmed to act as a proximity sensor.

Process 1500 begins with detection of a nearby transmitter at module 1510. At module 1520, information is exchanged, not only allowing for authentication, but also allowing for tracking by a person of what documents have been signed for example. Information may also be sent one-way. At module 1530, received information is compared with a stored list of authorized signers or classes of signers (managers, etc.) for example. At module 1540, a determination is made as to whether authorization is present and whether the document was signed (for digital signatures). If so, the document is authorized at module 1550 (this may be as simple as recording the signature for example). The process then returns to module 1510, allowing for multiple signatures for example.

Figure 16:
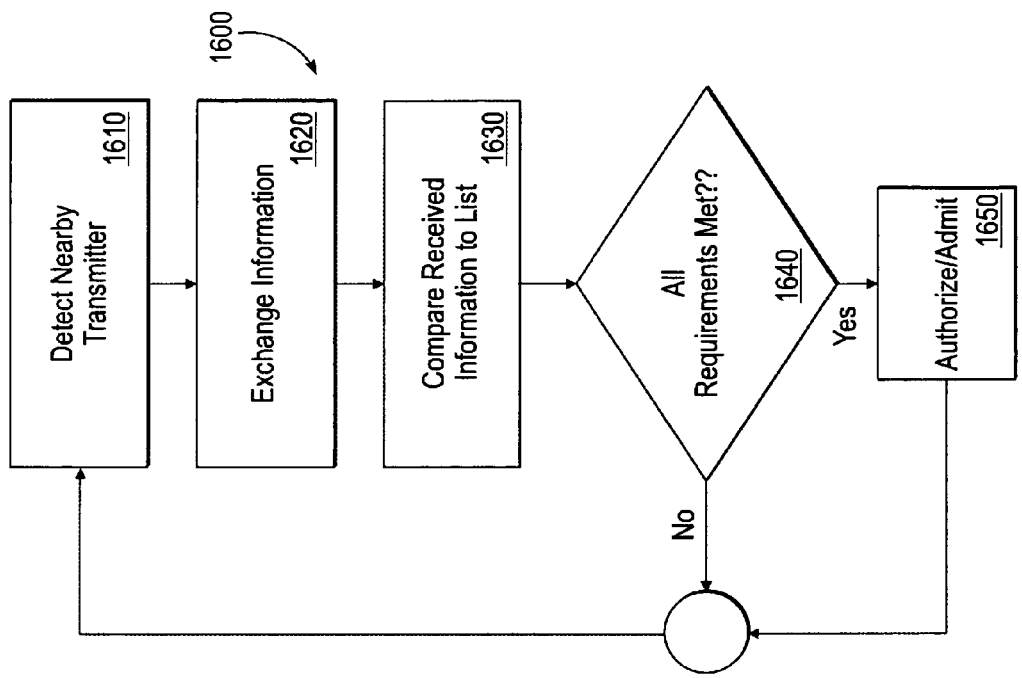
FIG. 16 illustrates an embodiment of a process of access control for hazardous areas.

Still another specific embodiment of the general process of FIG. 12 relates to authorization to enter restricted or hazardous areas, for example. FIG. 16 illustrates an embodiment of a process of access control for hazardous areas. Exemplary of such areas are some parts of oil rigs, which require that at least two people be present (for safety reason) or no one is allowed to work in the area. Exemplary of a restricted area may be a cleanroom where only people approved for the area may be those people who have previously learned the procedures for entering a cleanroom and may be expected to follow those procedures. In each example, sounding an alarm or denying access when conditions are not met may be appropriate.

Process 1600 initiates with detection of a nearby transmitter at module 1610. At module 1620, information is exchanged, not only allowing for authentication of users of a restricted area, but also allowing for tracking by a person of what areas have been visited, for example. Information may also be sent one-way (from the person to the sentry receiver device). At module 1630, received information is compared with a stored list of authorized people or with a set of conditions (restrictions, etc.) for example. At module 1640, a determination is made as to whether the person is authorized to enter, or whether conditions (such as minimum two people present for example) are met. If so, entry is authorized at module 1650 (this may be as simple as opening a door or not sounding an alarm for example). The process then returns to module 1610. Additionally, the process may be adapted to sounding an alarm when a person enters a restricted/hazardous area without appropriate gear (such as a cleanroom suit for a cleanroom or a hardhat for a hazardous area for example).

Figure 17:
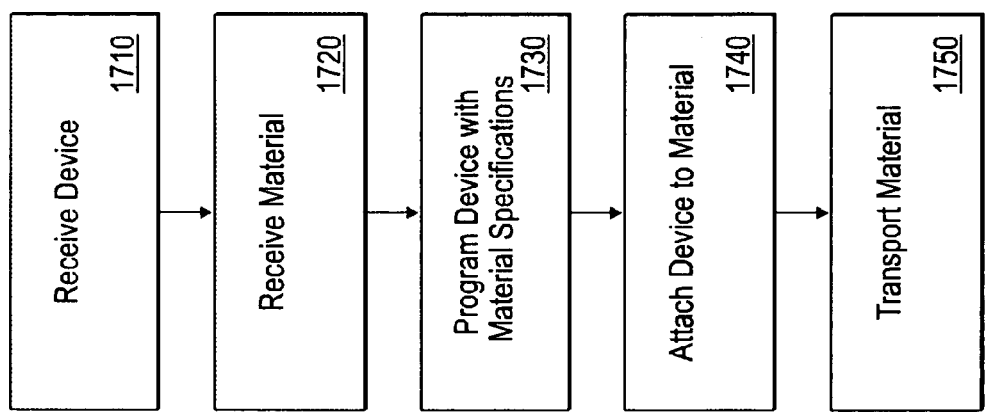
FIG. 17 illustrates an embodiment of preparing a proximity sensor.

Returning to proximity sensors for transported or stored material, a process of programming a proximity sensing device may be useful. Such a process may be adapted for other applications such as those of FIGS. 14-16, for example. FIG. 17 illustrates an embodiment of preparing a proximity sensor. Process 1700 includes receiving the device and material, programming the device, attaching the device to the material, and then storing or transporting the material. Such a process may be partially or fully automated in some instances. Process 1700 begins with receiving the proximity sensor in module 1710. At module 1720, the material to be transported to stored is received. At module 1730, the device (proximity sensor) is programmed with specifications for the material, such as an identifier or set of identifiers, a list of excluded materials, a list or set of requirements, or other data. Requirements may take the form of materials required to be present, and may further take the form of allowable temperature, altitude, or humidity ranges for example, or the form of an expiration date for the material, for example. At module 1740, the device is attached to the material, such as by affixing the device to exterior packaging for example. At module 1750, the material is transported or stored as the case may be.

Figure 18:
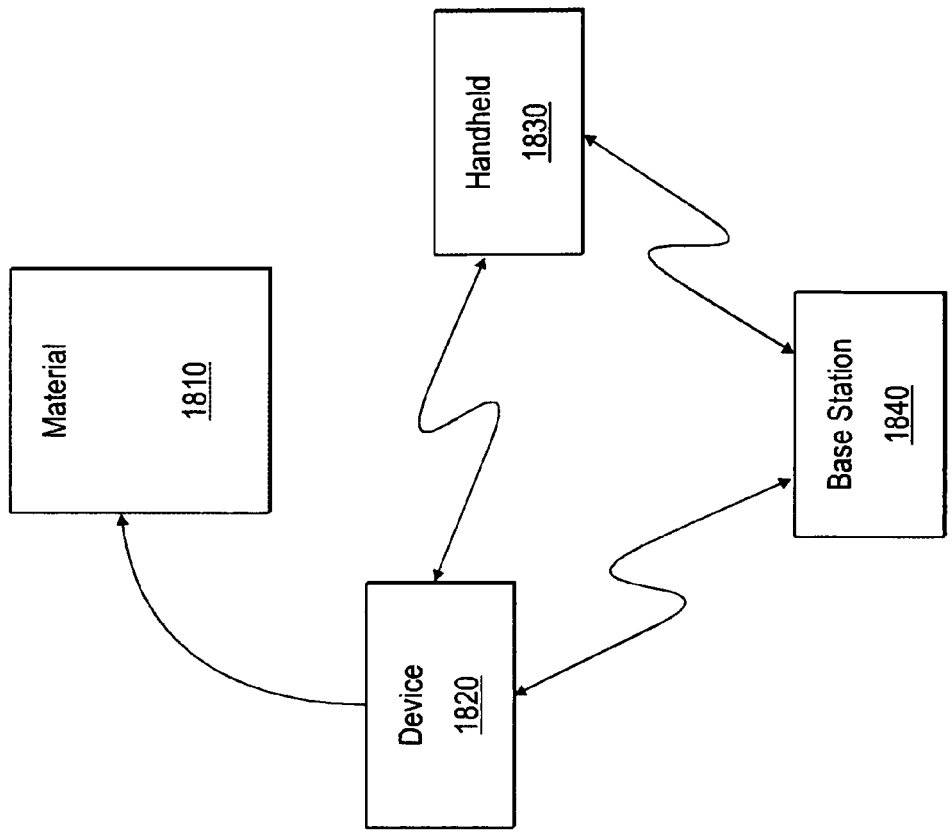
FIG. 18 illustrates an embodiment of a system useful in preparing a proximity sensor.

A system or apparatus may be useful to implement the method of FIG. 17. FIG. 18 illustrates an embodiment of a system useful in preparing a proximity sensor. Device 1820 represents the proximity sensor and material 1810 represents the material of FIG. 17. In one embodiment, a user or attendant may use a handheld device 1830 or similar fixed workstation to transmit programming instructions to device 1820, based on identifiable characteristics of material 1810 (such as a material name, product code, or other identifier). Handheld device 1830 may also be a scanner suitable for scanning a machine readable identifier of material 1810, for example. Moreover, a base station 1840 may be present, allowing for access to a network (not shown) or for access to a data repository for example, along with additional monitoring functions. Additionally, material 1810 may have a device such as a radio-frequency identifier (RFID) present, allowing for automated programming of device 1820 by base station 1840 without human intervention.

Figure 19:
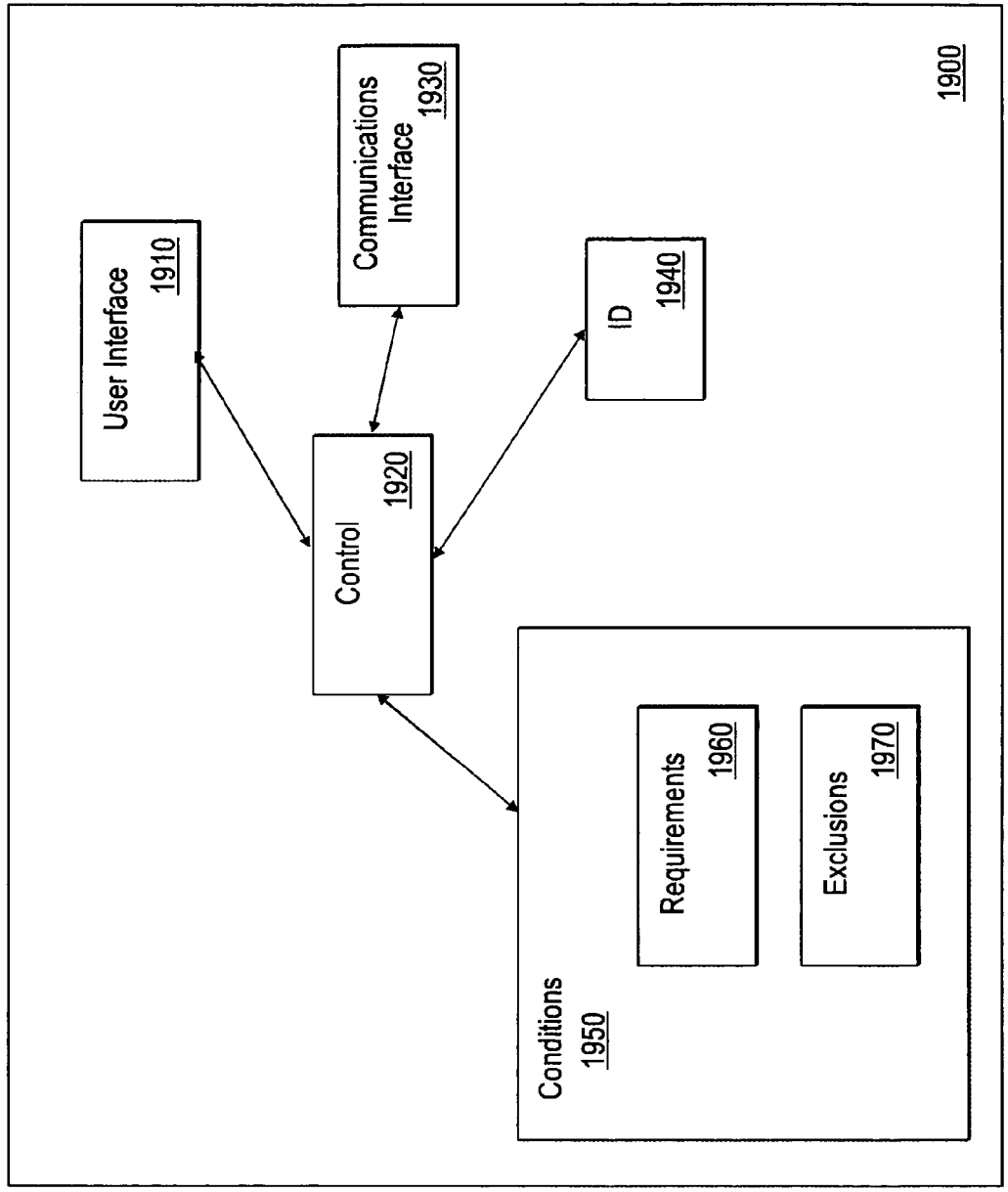
FIG. 19 illustrates an embodiment of a medium useful in conjunction with or as part of a proximity sensor.

When a proximity sensor or similar device is programmed, the programming may be embodied as instructions and/or data in a medium or media within the device. FIG. 19 illustrates an embodiment of a medium useful in conjunction with or as part of a proximity sensor. Medium 1900 may take various forms, as a single medium or multiple media of one or more forms, including various forms discussed previously with respect to FIG. 8 for example. Medium 1900 embodies instructions and data making up a user interface, control module, communications interface, identification, and conditions.

Control module 1920 controls the other portions of medium 1900 when the instructions of medium 1900 are executed or the data of medium 1900 are utilized by a processor or machine. User interface 1910 may control a user interface component, such as a traffic-light set of LEDs, a buzzer, or similar output components, and interpret signals received from input portions of a user interface component, such as a button for example. Communications interface 1930 may control and format data to be sent as output along a RF interface for example, and similarly may decode and reformat data received along the RF interface. Identifier 1940 may be a hardwired identifier for a device including the medium 1900, and/or may be a programmable identifier, such as for a proximity sensor which identifies the material associated therewith. Conditions 1950 may be a set of data representing conditions associated with material, access, authorization, expiration, or some other information. In particular, for a proximity sensor for material, conditions 1950 may include requirements 1960 (such as a set of identifiers for required materials which should be nearby for example) and/or exclusions 1970 (such as a set of identifiers for materials which should not be nearby, for example).

Figure 20:
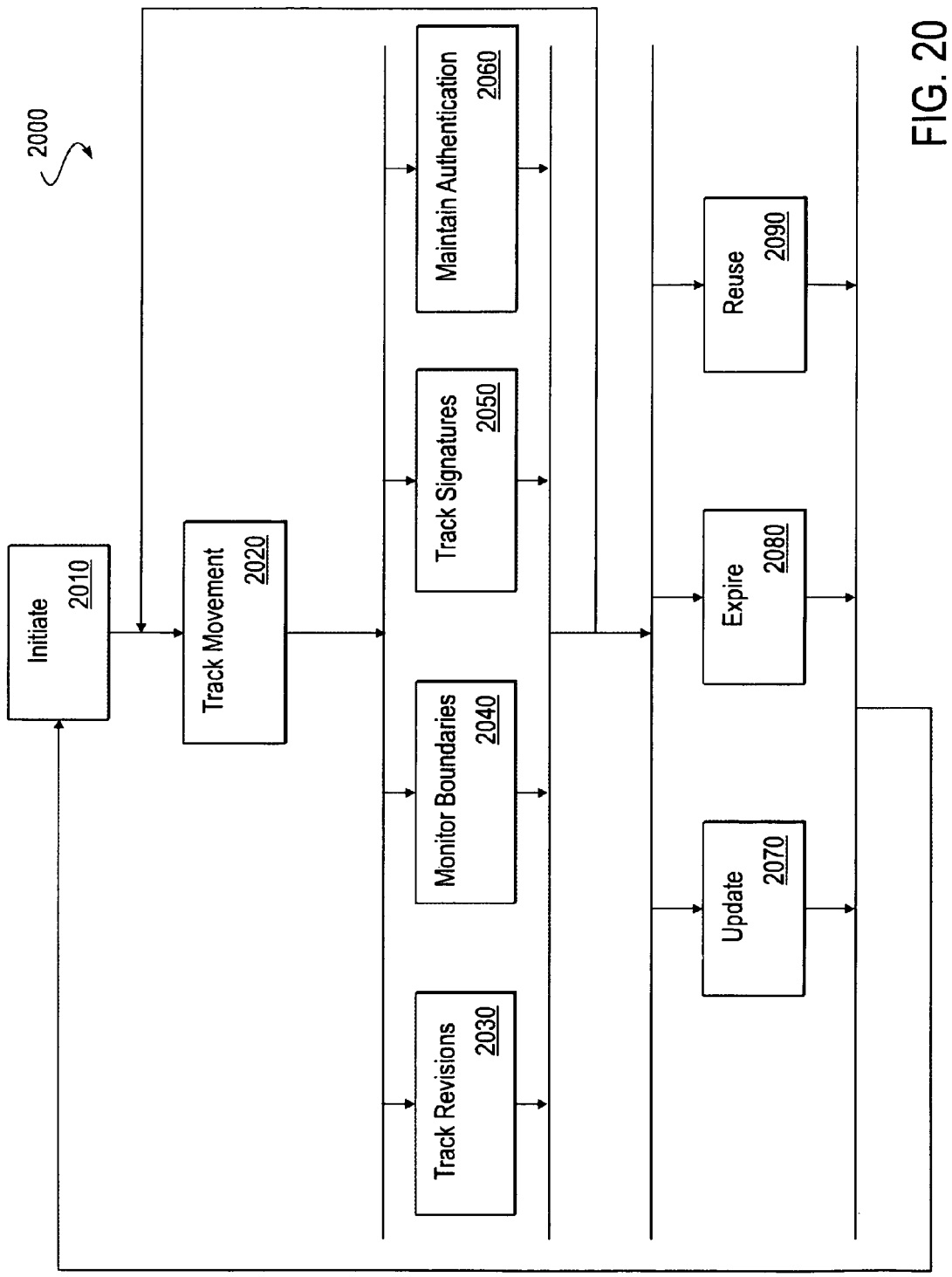
FIG. 20 illustrates an alternate embodiment of a process of proximity sensing.

The process of using devices embodying the medium of FIG. 19 and other tracking devices may be illustrated in a variety of ways, corresponding to many different embodiments. FIG. 20 illustrates an alternate embodiment of a process of proximity sensing. The process 2000 of FIG. 20 may be applicable to a variety of embodiments or applications, with suitable modifications or customizations. The process includes initiation, tracking movement, monitoring changes, boundaries, signatures and authentications, and determining significant changes such as updates, expirations, and reuse.

Process 2000 begins at module 2010 with initiation of the process, such as by programming a proximity sensor for a material or for a document. At module 2020, movement of the device is tracked, such as through a network of sensors, as motion recorded by receipt of GPS signals, or as encounters with other proximity sensors for various materials for example. Modules 2030, 2040, 2050, and 2060 may occur in parallel, as illustrated, or in some other fashion.

At module 2030, revisions to a document are tracked, for example, or changes to materials may be tracked. At module 2040, boundaries are monitored, such as by ensuring a document only moves within allowed areas (some documents may not go outside a building or into a bag for example), or ensuring a material does not leave a manufacturing facility or laboratory for example. In module 2050, signatures are tracked, such as for a document requiring authenticated signatures based on nearby proximity sensors for people, or for signatures on a bill of lading required to occur at shipping transition points for example. In module 2060, authentication may be maintained, such as by updating who is authorized to sign a document, enter an area, or use a material, or by recording who has done such actions for example.

Similarly, modules 2070, 2080 and 2090 may occur in parallel, as alternatives, or in some other fashion. Modules 2020, 2030, 2040, 2050 and 2060 all relate to ongoing activities for a document, material, or an area. Modules 2070, 2080 and 2090 relate to transitions in use or information. At module 2070, a document or material may be updated, such as when a document is revised, or when material is consumed or transformed in manufacturing, or when use of an area is changed, for example. At module 2080, a document or material may be expired, such as when a document is no longer current and/or maintained, when an area is no longer fit for entry, or when a material is believed to have lost its potency. At module 2090, a proximity sensor may be reused, such as for a different document, a different area, or for a new material for example. Thus, each of modules 2070, 2080 and 2090 may be transformational in a way which requires resynchronization with a network and/or significant reprogramming for example.

Note that interaction with a network or a larger system may occur on a near-constant basis, on an ongoing basis, on an infrequent basis, or on very rare intervals. Thus, modules such as modules 2030, 2040, 2050 and 2060 may involve activity within a device such as a proximity sensor or digiclip for example, or may involve activity within a networked system, such as an extensive and pervasive document management system which interacts with a digiclip, for example. Intermediate forms of such activity may also occur in some embodiments, such as an embodiment involving digiclips used in an office or industrial setting having a single station (or a few relatively isolated stations) at which information from digiclips is synchronized with a surrounding system.

Various items may be tracked using proximity sensing devices or similar dedicated forms of Motes or Smart-Its. For example, documents or files of documents may be tracked, such as in medical offices or facilities, legal offices, business locations, document storage facilities, government offices, or in other areas where documents may be found. Similarly, prototypes, manufacturing materials, commercial goods, and similar items may be tracked. Moreover, safety gear, personal items, clean/sanitized gear (such as cleanroom suits or medical smocks), tools, or other items may be tracked.

Such tracking may allow for avoidance of harmful interactions, prevention of movement of items beyond proscribed boundaries, prevention or admittance of people into restricted or hazardous areas, and other similar applications. As mentioned, material which should not be too hot or cold may have a proximity sensing device with an additional thermal sensor incorporated for example. Similarly, the document size sensor discussed above may be used in conjunction with proximity tracking. Additionally, information stored in relation to a document; item, area or other thing associated with a proximity sensor may relate both to things/people excluded or not allowed and things/people included or allowed, allowing for both positive or affirmative comparisons and negative comparisons. Other similar applications may be drawn from one embodiment and used with another embodiment mentioned in the document. Moreover, in general, features from one embodiment may be used with other embodiments mentioned in this document provided the features are not somehow mutually exclusive.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

We claim:

1. An apparatus, comprising:
a first proximity sensor, the first proximity sensor comprising:
a processor;
a memory coupled to the processor;
an alert component coupled to the processor;
a radio frequency interface coupled to the processor;
an antenna coupled to the radio frequency interface;
and wherein
the memory embodies an identifier of an associated item along with specific information related to the associated item and the memory embodies instructions which, when executed by the processor, cause the processor to exchange the identifier with a second proximity sensor through the radio frequency interface and antenna and cause the processor to compare the specific information with information received from the second proximity sensor, and the item is cargo and the specific information comprises identifiers of materials in other potential cargo excluded from co-location with the item, wherein the memory further embodies instructions, which, when executed by the processor, cause the processor to operate the alert output component responsive to affirmative comparison or negative comparison of the specific information with the information received from the second proximity sensor.

2. The apparatus of claim 1, further comprising:

a lock interface coupled to the processor;

and wherein the memory further embodies instructions, which, when executed by the processor, cause the processor to operate the lock interface responsive to affirmative comparison of the specific information with the information received from the second proximity sensor.

3. An apparatus, comprising:

a first proximity sensor coupled to a stationary object, the first proximity sensor including:

a processor;

a memory coupled to the processor;

an alert component coupled to the processor;

a radio frequency interface coupled to the processor;

an antenna coupled to the radio frequency interface;

and wherein the memory embodies a set of identifiers along with specific information related to the set of identifiers and the memory embodies instructions which, when executed by the processor, cause the processor to receive a comparison identifier from a second proximity sensor through the radio frequency interface and antenna and cause the processor to compare the comparison identifier with identifiers of the set of identifiers to determine whether or not materials associated with the comparison identifier are excluded from co-location with materials associated with the identifiers of the set of identifiers, wherein the memory further embodies instructions, which, when executed by the processor, cause the processor to operate the alert output component responsive to affirmative comparison or negative comparison of the identifiers with the comparison identifier received from the second proximity sensor.

4. The apparatus of claim 3, wherein the memory further embodies an apparatus identifier and the memory embodies further instructions which, when executed by the processor, cause the processor to send the apparatus identifier to any nearby proximity sensor through the radio frequency interface and antenna.

5. A system, comprising:

a first proximity sensor coupled to a stationary object, the first proximity sensor including:

a processor;

a memory coupled to the processor;

an alert output component coupled to the processor;

a radio frequency interface coupled to the processor;

an antenna coupled to the radio frequency interface;

and wherein the memory embodies a set of identifiers along with specific information related to the set of identifiers and the memory embodies instructions which, when executed by the processor, cause the processor to receive a comparison identifier from a second proximity sensor through the radio frequency interface and antenna and cause the processor to compare the comparison identifier with identifiers of the set of identifiers; and the second proximity sensor coupled to a person, the second proximity sensor including:

a processor;

a memory coupled to the processor;

a radio frequency interface coupled to the processor;

an antenna coupled to the radio frequency interface;

and wherein the memory embodies an identifier of an associated person along with specific information related to the associated person and the memory embodies instructions which, when executed by the processor, cause the processor to provide the identifier to nearby proximity sensors through the radio frequency interface and antenna, wherein the stationary object comprises a boundary of a hazardous area and the set of identifiers comprises identifiers encoding identities of people authorized to enter the hazardous area, wherein the memory further embodies instructions, which, when executed by the processor, cause the processor to operate the alert output component responsive to affirmative comparison or negative comparison of the specific information with the information received from the second proximity sensor.

6. The system of claim 5, wherein:

the first proximity sensor is coupled to a door and the set of identifiers includes identifiers encoding identities of people authorized to pass through the door.

7. The system of claim 6, wherein:

the identifier of the second proximity sensor encodes an identity of a person associated with the second proximity sensor.

8. The system of claim 5, wherein:

the identifier of the second proximity sensor encodes an identity of a person associated with the second proximity sensor.

9. The system of claim 5, wherein the first proximity sensor further includes:

an actuator operation component coupled to the processor;

and wherein the memory further embodies instructions, which, when executed by the processor, cause the processor to operate the alert output component responsive to affirmative comparison of the specific information with the information received from the second proximity sensor.

10. The system of claim 9, wherein:

the first proximity sensor is coupled to a door; and the actuator operation component is an interface with an electronically controlled lock of the door.

11. The system of claim 10, wherein:

the first proximity sensor further includes:

an actuator operation component coupled to the processor, the actuator operation component is an interface with an electronically controlled lock of the door;

and wherein the memory further embodies instructions, which, when executed by the processor, cause the processor to operate the alert output component responsive to affirmative comparison of the specific information with the information received from the second proximity sensor.

12. The system of claim 11, wherein the first proximity sensor further includes:

a user input component coupled to the processor;

and wherein the memory further embodies instructions, which, when executed by the processor, cause the processor to store in memory an indication of operation of the user input component responsive to affirmative and contemporaneous comparison of the specific information with the information received from the second proximity sensor.

13. A computer program product being tangibly embodied on a computer-readable medium and including executable code that, when executed, is configured to cause:
at least a first proximity sensor having a processor to:
receive a comparison identifier from at least a second proximity sensor through a radio frequency interface and an antenna, and
compare the comparison identifier with identifiers of a set of identifiers, wherein the set of identifiers is embodied in a memory of the first proximity sensor and wherein the first proximity sensor is coupled to a stationary object; and
at least the second proximity sensor having a processor to:
provide an identifier of an associated person to nearby proximity sensors through a radio frequency interface and an antenna, wherein the identifier of the associated person and specific information related to the associated person are embodied in a memory of the second proximity sensor and wherein the second proximity sensor is coupled to a person, wherein the stationary object comprises a boundary of a hazardous area and the set of identifiers comprises identifiers encoding identities of people authorized to enter the hazardous area,
wherein the first proximity sensor further comprises an alert output component coupled to the processor; and
wherein the computer program product further causes the first proximity sensor to operate the alert output component responsive to affirmative comparison or negative comparison of the specific information with the information received from the second proximity sensor.

14. The computer program product of claim 13, wherein:
the first proximity sensor is coupled to a door and the set of identifiers includes identifiers encoding identities of people authorized to pass through the door.

15. The computer program product of claim 14, wherein:
the identifier of the second proximity sensor encodes an identity of a person associated with the second proximity sensor.

16. The computer program product of claim 13, wherein:
the identifier of the second proximity sensor encodes an identity of a person associated with the second proximity sensor.

17. The computer program product of claim 13, wherein the first proximity sensor further includes:
an actuator operation component coupled to the processor;
and wherein the computer program product further causes the first proximity sensor to operate the alert output component responsive to affirmative comparison of the specific information with the information received from the second proximity sensor.

18. The computer program product of claim 17, wherein:
the first proximity sensor is coupled to a door; and
the actuator operation component is an interface with an electronically controlled lock of the door.

19. The computer program product of claim 18, wherein:
the first proximity sensor further includes:
an actuator operation component, wherein the actuator operation component is an interface with an electronically controlled lock of the door;
and wherein the computer program product further causes the first proximity sensor to operate the alert output component responsive to affirmative comparison of the specific information with the information received from the second proximity sensor.

20. The computer program product of claim 19, wherein the first proximity sensor further includes:
a user input component coupled to the processor;
and wherein the computer program product further causes the first proximity sensor to store in the memory an indication of operation of the user input component responsive to affirmative and contemporaneous comparison of the specific information with the information received from the second proximity sensor.

21. A method, comprising:
receiving, at a first proximity sensor having a processor, a comparison identifier from a second proximity sensor through a radio frequency interface and an antenna;
comparing the comparison identifier with identifiers of a set of identifiers, wherein the set of identifiers is embodied in a memory of the first proximity sensor and wherein the first proximity sensor is coupled to a stationary object; and
providing, from the second proximity sensor having a processor, an identifier of an associated person to nearby proximity sensors through a radio frequency interface and an antenna, wherein the identifier of the associated person and specific information related to the associated person are embodied in a memory of the second proximity sensor and wherein the second proximity sensor is coupled to a person, wherein the stationary object comprises a boundary of a hazardous area and the set of identifiers comprises identifiers encoding identities of people authorized to enter the hazardous area,
wherein the first proximity sensor further comprises an alert output component coupled to the processor; and
the method further comprises operating the alert output component responsive to affirmative comparison or negative comparison of the specific information with the information received from the second proximity sensor.

22. The method as in claim 21, wherein:
the first proximity sensor is coupled to a door and the set of identifiers includes identifiers encoding identities of people authorized to pass through the door.

23. The method as in claim 22, wherein:
the identifier of the second proximity sensor encodes an identity of a person associated with the second proximity sensor.

24. The method as in claim 21, wherein:
the identifier of the second proximity sensor encodes an identity of a person associated with the second proximity sensor.

25. The method as in claim 21, wherein the first proximity sensor further includes:
an actuator operation component coupled to the processor;
and the method further comprises operating the alert output component responsive to affirmative comparison of the specific information with the information received from the second proximity sensor.

26. The method as in claim 25, wherein:
the first proximity sensor is coupled to a door; and
the actuator operation component is an interface with an electronically controlled lock of the door.

27. The method as in claim 26, wherein:
the first proximity sensor further includes:
an actuator operation component, wherein the actuator operation component is an interface with an electronically controlled lock of the door;
and the method further comprises operating the alert output component responsive to affirmative comparison of the specific information with the information received from the second proximity sensor.

28. The method as in claim 27, wherein the first proximity sensor further includes:

a user input component coupled to the processor;

and the method further comprises storing an indication of operation of the user input component responsive to affirmative and contemporaneous comparison of the specific information with the information received from the second proximity sensor.

* * * * *